(12) United States Patent
Matsumoto

(10) Patent No.: US 8,958,693 B2
(45) Date of Patent: Feb. 17, 2015

(54) WAVELENGTH SELECTIVE SWITCH

(75) Inventor: Koji Matsumoto, Hachioji (JP)

(73) Assignee: JDS Uniphase Corporation, Milpitas, CA (US)

( * ) Notice: Subject to any disclaimer, the term of this patent is extended or adjusted under 35 U.S.C. 154(b) by 714 days.

(21) Appl. No.: 13/050,230

(22) Filed: Mar. 17, 2011

(65) Prior Publication Data

US 2011/0229132 A1 Sep. 22, 2011

(30) Foreign Application Priority Data

Mar. 19, 2010 (JP) ................. 2010-064064

(51) Int. Cl.
*H04J 14/00* (2006.01)
*G02B 6/35* (2006.01)

(52) U.S. Cl.
CPC ............ *G02B 6/3518* (2013.01); *G02B 6/3548* (2013.01)
USPC ............ 398/48; 398/45; 398/50; 398/55; 398/56; 398/82; 398/87; 398/96; 385/16; 385/17; 385/18; 385/24; 359/223.1

(58) Field of Classification Search
USPC .............. 398/45–57, 79; 385/16–24, 53; 359/223.1, 238
See application file for complete search history.

(56) References Cited

U.S. PATENT DOCUMENTS

| | | | |
|---|---|---|---|
| 6,798,941 B2 | 9/2004 | Smith et al. | |
| 7,106,924 B2 * | 9/2006 | Sano et al. | 385/16 |
| 7,447,399 B2 * | 11/2008 | Aota et al. | 385/18 |
| 7,599,587 B2 * | 10/2009 | Nishizawa et al. | 385/18 |
| 7,636,503 B2 * | 12/2009 | Yamamoto et al. | 385/18 |
| 2006/0093258 A1 * | 5/2006 | Terahara et al. | 385/18 |
| 2006/0140536 A1 * | 6/2006 | Aota et al. | 385/18 |
| 2006/0198583 A1 * | 9/2006 | Oikawa et al. | 385/53 |
| 2008/0239444 A1 * | 10/2008 | Aota et al. | 359/223 |
| 2009/0060416 A1 * | 3/2009 | Yamamoto et al. | 385/24 |
| 2009/0067780 A1 * | 3/2009 | Nishizawa et al. | 385/17 |
| 2009/0245727 A1 * | 10/2009 | Shimizu et al. | 385/18 |
| 2009/0297149 A1 * | 12/2009 | Nakazato et al. | 398/79 |
| 2010/0021167 A1 * | 1/2010 | Aota et al. | 398/79 |
| 2010/0188724 A1 * | 7/2010 | Kobayashi et al. | 359/238 |
| 2010/0245964 A1 * | 9/2010 | Mizuno | 359/223.1 |
| 2011/0150389 A1 * | 6/2011 | Hu et al. | 385/18 |
| 2012/0219252 A1 * | 8/2012 | Marom | 385/16 |

* cited by examiner

*Primary Examiner* — Li Liu
(74) *Attorney, Agent, or Firm* — JDS Uniphase Corporation

(57) ABSTRACT

A wavelength selective switch includes a light input/output unit that includes an input unit and an output unit of a wavelength multiplexed light arranged in a form of an array in a first direction, a light dispersing unit that receives the wavelength multiplexed light from the input unit and disperses the wavelength multiplexed light into signal wavelengths, a light condensing element that condenses the light dispersed into the signal wavelengths, and a light deflecting element array that deflects a signal light in the first direction and a second direction, that is orthogonal to the first direction, so as to switch the light of the signal wavelengths condensed by the light condensing element to a desired output unit. In the wavelength selective switch, the light condensing element and the light deflecting element array are arranged such that a light launched from the input unit is incident on a surface orthogonal to a passing direction at an angle that is not orthogonal within a deflection range of the light deflecting element array.

12 Claims, 30 Drawing Sheets

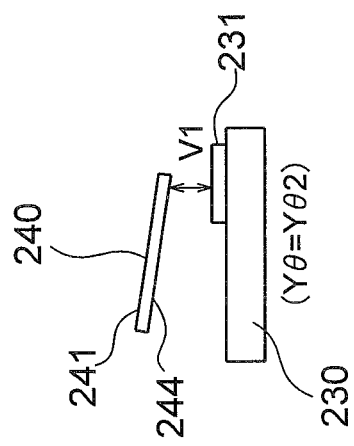
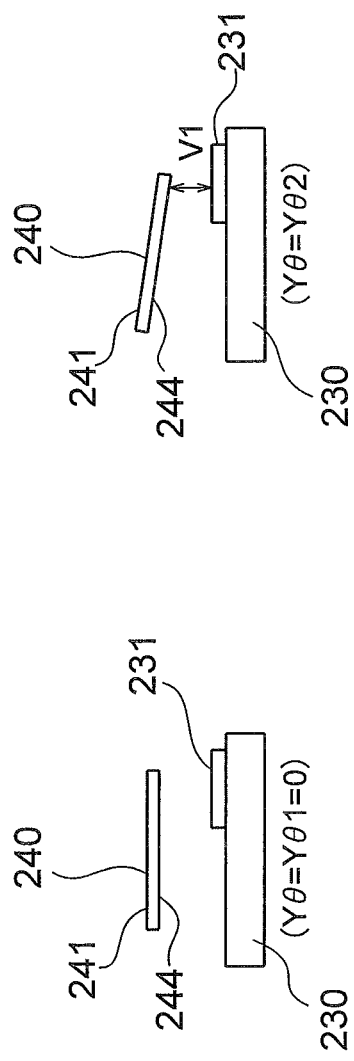

WAVELENGTH SELECTIVE SWITCH

CROSS-REFERENCE TO RELATED APPLICATION

The present application is based upon and claims the benefit of priority from the prior Japanese Patent Application No. 2010-064064 filed on Mar. 19, 2010; the entire contents of which are incorporated herein by reference.

BACKGROUND OF THE INVENTION

1. Field of the Invention

The present invention relates to a wavelength selective switch.

2. Description of the Related Art

A wavelength selective switch controls an angle of a mirror in a mirror array according to a wavelength. In such a wavelength selective switch, while a light of a certain wavelength from an arbitrary input port is being output to an output port, a light from an unintended input port should not be output to an output port when an input port is switched to a different input port. As one of the methods to prevent the light of the unintended input port from being output to the output port, the mirror can be once panned in a light dispersion direction to sufficiently suppress an intensity of the light from the input port being coupled. In this method, the input port is switched to an arbitrary input port by panning the mirror again in the angle dispersion direction after the mirror is panned in a port switching direction under a state in which the light from any input port is not output to the output port (for example, U.S. Pat. No. 6,798,941). This method is generally referred to as hitless method.

Furthermore, it is widely known that broadening of a band of the wavelength selective switch can be effectively achieved by decreasing a spot diameter on the mirror in the mirror array.

However, if the spot diameter is decreased to achieve the broadening of the band, a decrease in a transmittance with respect to a panning angle of the mirror is reduced during the hitless operation, thus causing difficulty in executing the hitless operation. Accordingly, a panning amplitude of the mirror should be increased to achieve broadening of the band of the wavelength selective switch in the hitless operation; however, there has been a problem that the increase in the panning amplitude is limited by a structure of the mirror.

SUMMARY OF THE INVENTION

The present invention is made in view of the above discussion and it is an object of the present invention to realize a hitless operation without increasing a range of a panning angle of a mirror in a broadband wavelength selective switch.

To solve the above problems and to achieve the above objects, a wavelength selective switch according to an aspect of the present invention includes an optical input/output unit that includes an input unit and an output unit of a wavelength multiplexed light that are arranged in a form of an array in a first direction; a light dispersing unit that receives the wavelength multiplexed light from the input unit and disperses the wavelength multiplexed light into signal wavelengths; a light condensing element that condenses the light dispersed into the signal wavelengths; and a light deflecting element array that deflects a signal light in the first direction and a second direction, that is orthogonal to the first direction, so as to switch a light of the signal wavelengths condensed by the light condensing element to a desired output unit. The light condensing element and the light deflecting element array are arranged such that a light launched from the input unit is incident on a surface orthogonal to a passing direction at an angle that is not orthogonal within a deflection range of the light deflecting element array.

In the wavelength selective switch according to an aspect of the present invention it is preferable that the light dispersing unit and the light condensing element are arranged such that the passing direction of the light of the signal wavelengths condensed by the light condensing element does not coincide with a central axis of the light condensing element in the second direction.

In the wavelength selective switch according to an aspect of the present invention it is preferable that the passing direction of the light of the signal wavelengths condensed by the light condensing element coincides with a central axis of the light condensing element in the second direction, and the light deflecting element array is inclined such that the light launched from the input unit is incident on the surface orthogonal to the passing direction with the angle that is not orthogonal within the deflection range of the light deflecting element array.

In the wavelength selective switch according to an aspect of the present invention it is preferable that the light condensing element is arranged at a position in the second direction offset from a position where the passing direction of the light of the signal wavelengths condensed by the light condensing element coincide with the central axis of the light condensing element.

In the wavelength selective switch according to an aspect of the present invention it is preferable that the light deflecting element array is a mirror array that includes a plurality of mirrors arranged along the second direction, and the mirrors are always inclined with respect to an axis connecting points on each mirror where light is condensed.

BRIEF DESCRIPTION OF THE DRAWINGS

FIG. 14A depicts a comparative example in which a position of the angle Yθ is not offset, and FIG. 14B depicts a comparative example in which the position of the angle Yθ is offset;

FIG. 16A depicts a state when the angle Yθ and Yθ1, and FIG. 16B depicts a state when the angle Yθ is Yθ2;

FIGS. 18A and 19B are side views from a direction of an axis shown in FIG. 17, FIG. 18A depicts a state when the angle Yθ is Yθ1, and FIG. 18B depicts a state when the angle Yθ is Yθ2;

FIG. 20A depicts a state when the angle Yθ is Yθ1, and FIG. 20B depicts a state when the angle Yθ is Yθ2;

DETAILED DESCRIPTION OF THE INVENTION

Exemplary embodiments of a wavelength selective switch according to the present invention are explained in detail below with reference to the accompanying drawings. The present invention is not limited to the following embodiments.

First Embodiment

Figure 1:
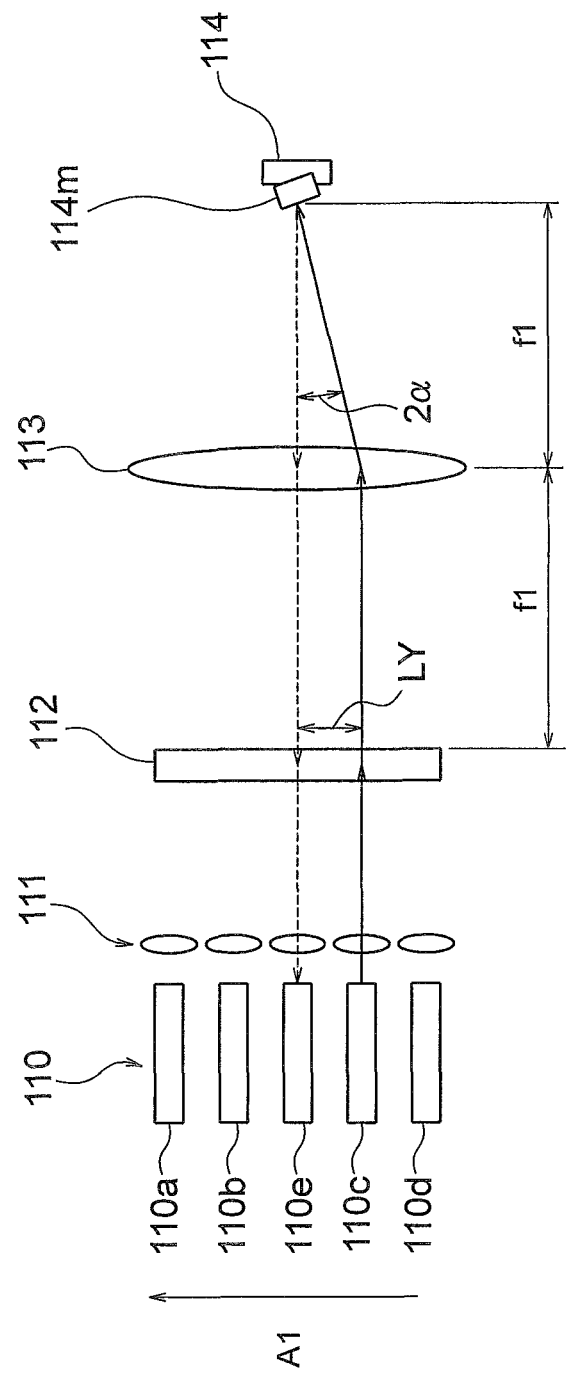
FIG. 1 is a side view of a structure of a wavelength selective switch according to a first embodiment.
Figure 2:
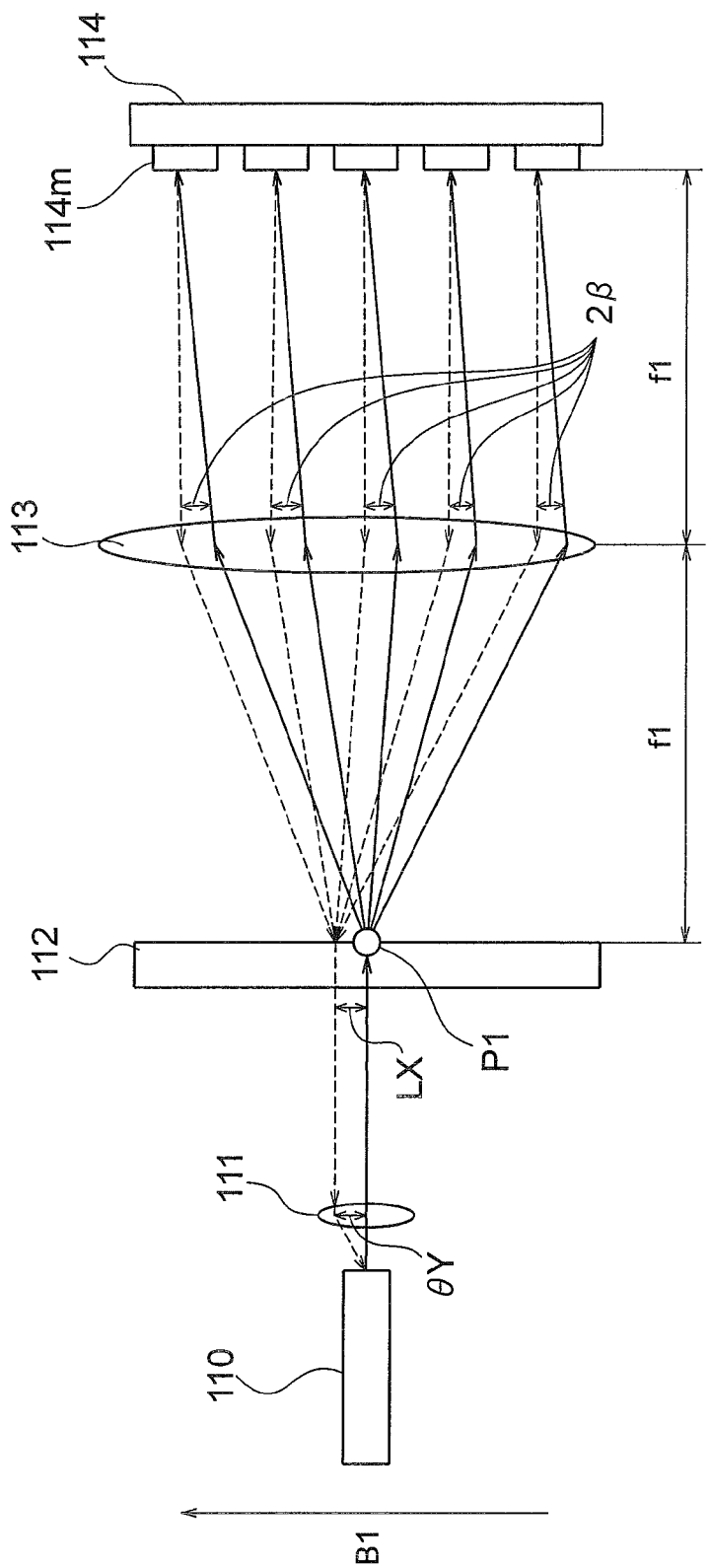
FIG. 2 is a top view of the structure of the wavelength selective switch according to the first embodiment.
Figure 3:
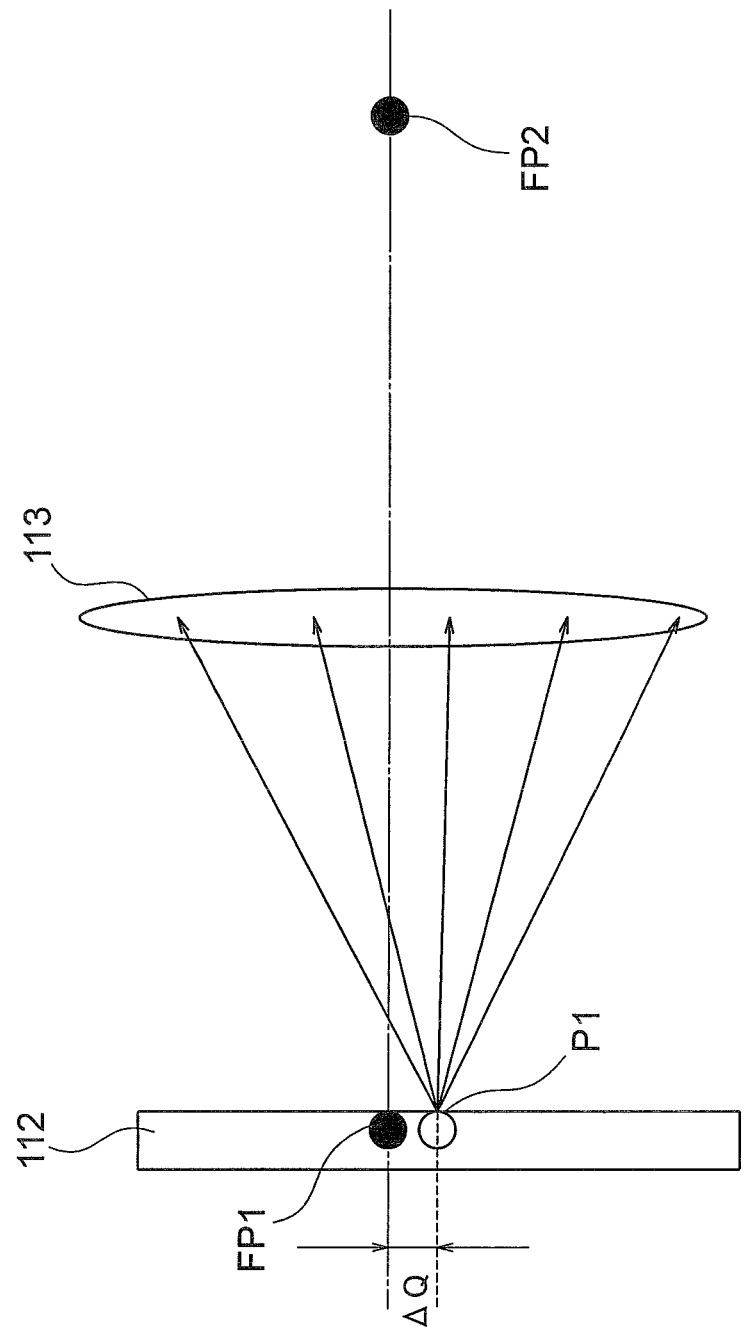
FIG. 3 is an enlarged view of a dispersion element and a light condensing lens shown in FIG. 2.

FIG. 1 is a side view of a structure of the wavelength selective switch according to a first embodiment. FIG. 2 is a top view of the structure of the wavelength selective switch. FIG. 3 is an enlarged view of a dispersion element 112 and a light condensing lens 113 shown in FIG. 2.

The wavelength selective switch according to the first embodiment includes an input/output port 110 as a light input/output unit, a lens array 111, the dispersion element 112 as a light dispersing unit, the light condensing lens 113 as a light condensing element, and a mirror array 114 as a light deflecting element array.

The input/output port 110 includes a plurality of input/output ports. In the example shown in FIG. 1, the input/output port 110 includes four input ports 110a, 110b, 110c, and 110d and an output port 110e that are arranged as an array with the same interval along a first direction A1 with the output port 110e at the center. The number of the input/output ports and the arrangement of the input/output ports are not restricted to this example. Furthermore, FIG. 2 depicts a case in which a wavelength multiplexed light is input only from one input port for the sake of simplicity; however, wavelength multiplexed lights are input from a plurality of the input ports in real cases.

The lens array 111 includes a plurality of lenses that at least corresponds to each of the input/output ports of the input/output port 110. The lights input from the input ports 110a, 110b, 110c, and 110d are transformed by the corresponding lenses in the lens array 111 into collimated lights, and the collimated lights pass to the dispersion element 112.

The dispersion element 112 disperses the light collimated by the lens array 111 into different angles depending on wavelengths, along a second direction B1 (FIG. 2) that is orthogonal to the first direction A1 (FIG. 1). The wavelength multiplexed light incident on the dispersion element 112 passes at different angles, depending on each wavelength, from a dispersion point P1 in the second direction B1.

As the dispersion element 112, a reflection dispersion element can also be used instead of a transmission dispersion element shown in FIGS. 1 and 2.

The light condensing lens 113 has a focal length $f_1$. The lights of the wavelengths dispersed by the dispersion element 112 are, respectively, condensed on a plurality of mirrors 114m of the mirror array 114.

The dispersion element 112 should preferably be separated from the light condensing lens 113 by the focal length $f_1$. The reason is that if an interval between the dispersion element 112 and the light condensing lens 113 is offset from the focal length $f_1$, the angles of lights of the wavelengths launched from the light condensing lens 113 differ for each wavelength. In other words, if the interval between the dispersion element 112 and the light condensing lens 113 is the focal length $f_1$, the lights launched from the light condensing lens 113 pass to the mirrors 114m of the mirror array 114 in a direction that corresponds to each wavelength.

As shown in FIG. 3, the light condensing lens 113 is arranged such that an optical axis connecting a front side focal point FP1 and a rear side focal point FP2 passes through a point which is offset by ΔQ from the dispersion point P1 of the dispersion element 112 along the second direction B1.

Thus, among the lights of the wavelengths dispersed by the dispersion element 112, a light of a wavelength λc, whose angle relative to the second direction B1 is the same as an optical axis of the dispersion element 112, passes with the angle relative to the second direction B1, which is the same as the optical axis of the light condensing lens 113 while the light of the wavelength λc is dispersed by the dispersion element 112 and incident on the light condensing lens 113. The light of the wavelength λc passes through a position that is offset from the optical axis of the light condensing lens 113 by ΔQ along the second direction B1, and passes through the light condensing lens 113 to the mirror 114m of the mirror array 114 along a direction that is different from the optical axis of the light condensing lens 113 along the second direction B1. Accordingly, the lights of the wavelengths launched from the light condensing lens 113 pass parallel to a direction that differs from the optical axis of the light condensing lens 113 along the second direction B1.

The light of the wavelength λc is a light of a signal wavelength whose angle in the second direction B1 coincides with the optical axis of the light condensing lens 113 in an interval between the dispersion element 112 and the light condensing lens 113.

Figure 4:
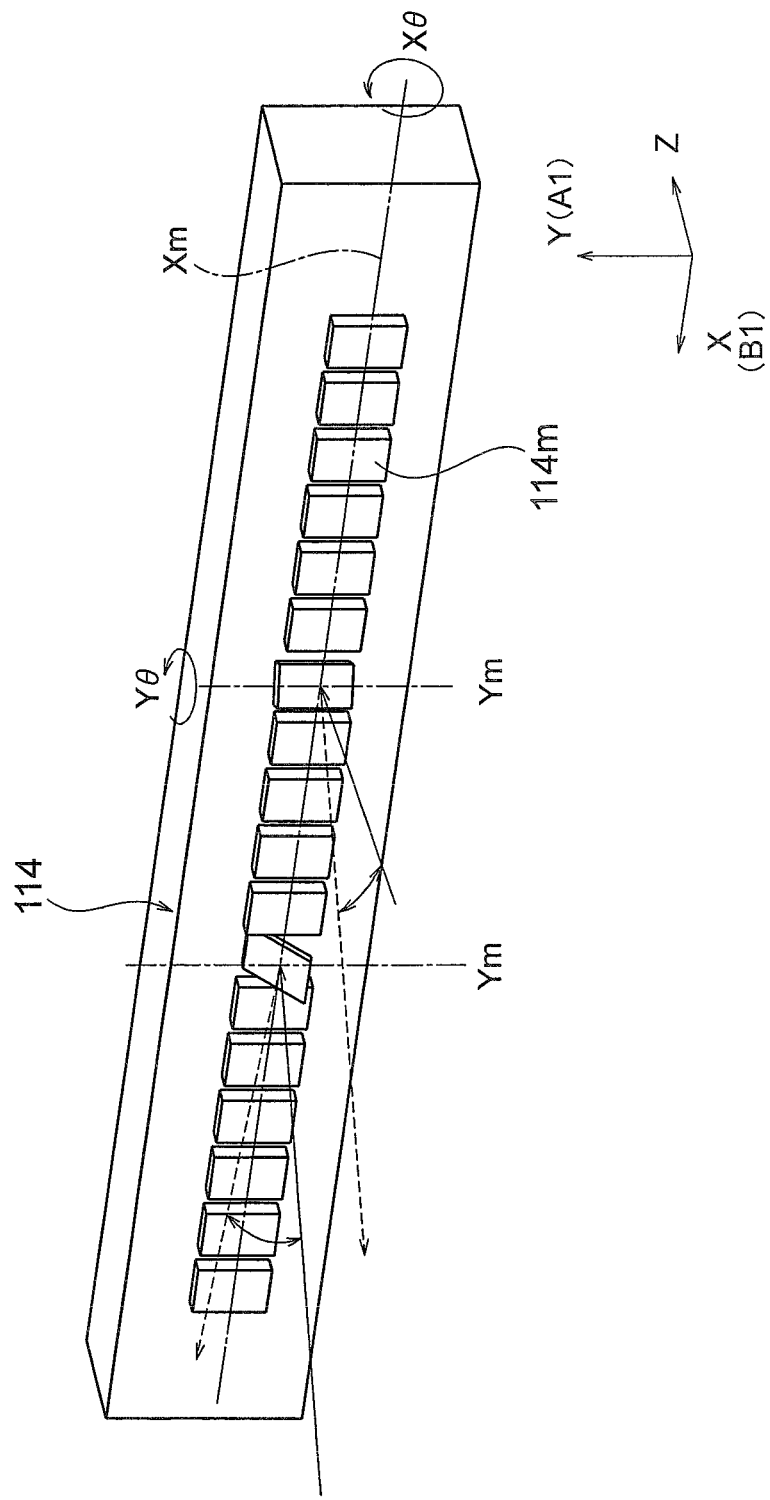
FIG. 4 is a perspective view of a structure of a mirror array according to the first embodiment.
Figure 5A:
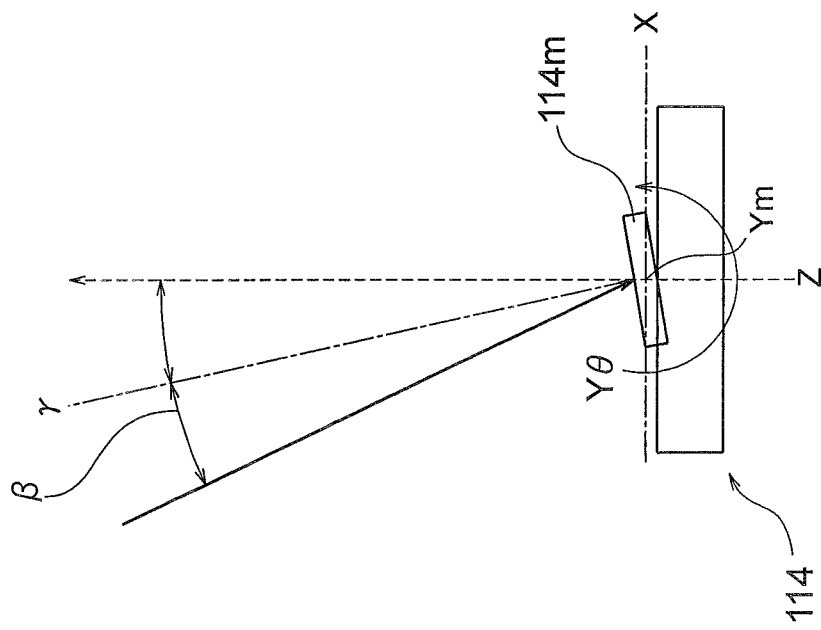
FIG. 5A depicts a reflection of a light incident on a mirror with an offset of α when viewed from a second direction.
Figure 5B:
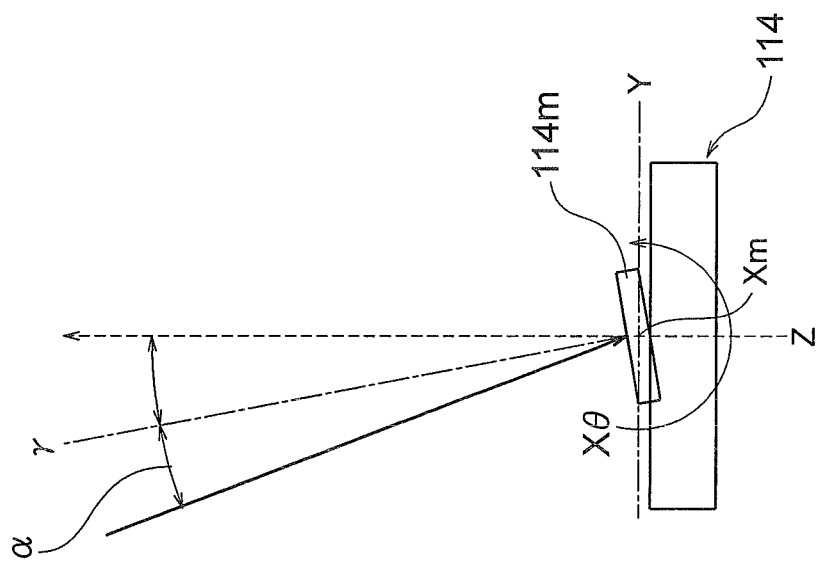
FIG. 5B depicts a reflection of a light incident on the mirror with an offset of β when viewed from a first direction.

FIG. 4 is a perspective view of a structure of the mirror array 114. FIG. 5A depicts a reflection of the light incident on the mirror 114m with an offset of α when viewed from the second direction B1. FIG. 5B depicts a reflection of the light incident on the mirror 114m with an offset of β when viewed from the first direction A1.

The mirror array 114 includes a plurality of the mirrors 114m arranged along the second direction B1. As shown in FIGS. 4, 5A, and 5B, each of the mirrors 114m can independently rotate about an axis Xm along an X-axis by an angle Xθ and about an axis Ym along a Y-axis by an angle Yθ. The X-axis corresponds to the second direction B1 and the Y-axis corresponds to the first direction A1.

Each of the mirrors 114m corresponds to each light dispersed by the dispersion element 112 for each wavelength. These lights are launched by the light condensing lens 113 to directions that differ from the optical axis of the light condensing lens 113, and condensed at centers of the corresponding mirrors 114m. The lights are condensed on the mirrors 114m with angles that are inclined with respect to reflective surfaces of the mirrors 114m and reflected by the mirrors 114m at angles different from the angles of incidence.

The mirror array 114 is arranged such that an interval between a center of the reflective surface of each mirror 114m and the light condensing lens 113 coincides with the focal length $f_1$. The center of the reflective surface of the mirror 114m approximately coincides with an intersection point of the rotation axis Xm of the angle Xθ and the rotation axis Ym of the angle Yθ. With this arrangement, the lights that are dispersed for each wavelength are condensed at the center of the reflective surface of the mirror 114m. An axis connecting a condensing point of the light of each wavelength is an axis along the X-axis that is orthogonal to the optical axis of the light condensing lens 113.

At this time, as shown in FIGS. 5A and 5B, when a light is incident with an angle of incidence α in the first direction A1 and an angle of incidence β in the second direction B1 by panning the mirror 114m by the respective angles Xθ and Yθ, the light is reflected by the mirror 114m, from the incident light, to a direction inclined by an angle 2α (FIG. 5A) in the first direction A1 and by an angle 2β (refer to FIG. 5B) in the second direction B1.

The light, which is reflected by the mirror 114m of the mirror array 114, passes to the light condensing lens 113 as a large light flux. When the panning angle of each mirror 114m is the same, the lights of all the wavelengths passed to the light condensing lens 113 are condensed at one point on the dispersion element 112, and launched from the dispersion element 112 as wavelength multiplexed collimated lights.

A condensing point where the lights are condensed on the dispersion element 112 is a position that is separated by an interval L from a dispersion point on the dispersion element 112 where the wavelength multiplexed light from the input port is dispersed in different directions depending on the wavelengths. A component LX in the second direction B1 and a component LY in the first direction A1 of the interval L are expressed by Equations (1) and (2) given below with the focal length $f_1$ of the light condensing lens 113 and the angles of incidence α and β on the mirror 114m.

$$LX = f_1 \cdot \tan(2\beta) \quad (1)$$

$$LY = f_1 \cdot \tan(2\alpha) \quad (2)$$

The collimated light whose wavelengths are multiplexed by the dispersion element 112 is incident on a lens corresponding to the output port 110e among the lenses in the lens array 111. The collimated light is not incident on a center of the lens; however, it is incident on a position that is displaced from the center by LX in the second direction B1. The collimated light is incident with the same angle as the optical axis of the lens and the light launched from the lens is condensed on the output port 110e.

Figure 6:
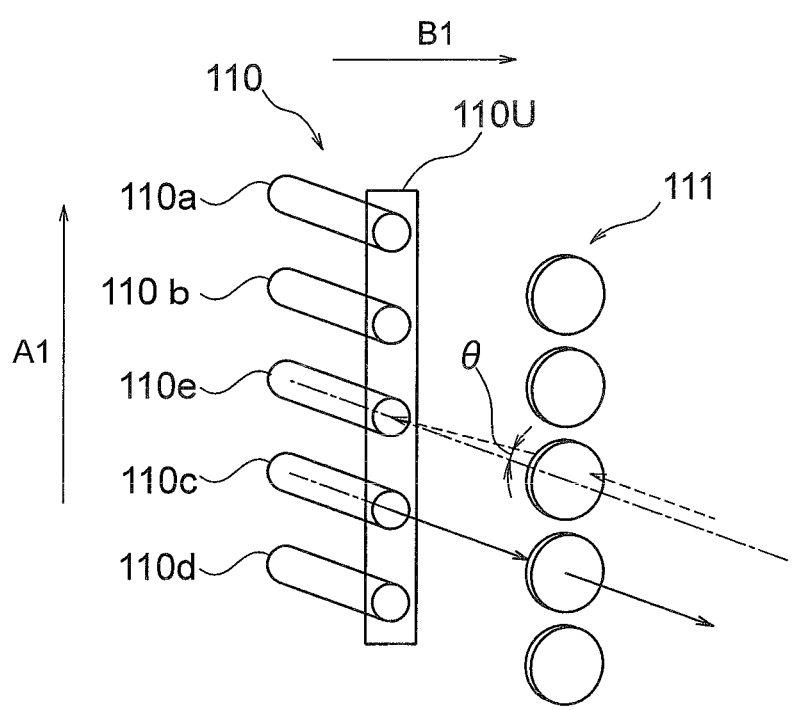
FIG. 6 is a perspective view of an arrangement of an input/output port and a lens array according to the first embodiment.
Figure 7:
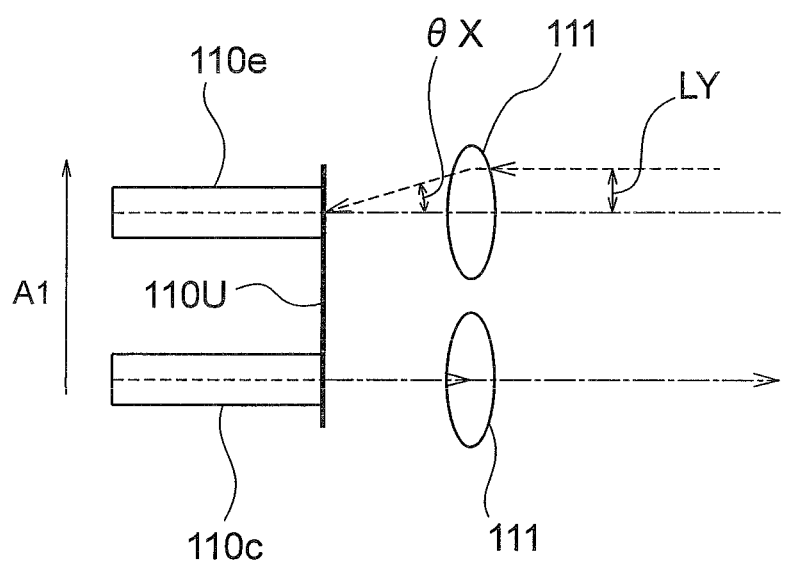
FIG. 7 is an enlarged side view of a portion of FIG. 6 from the second direction.
Figure 8:
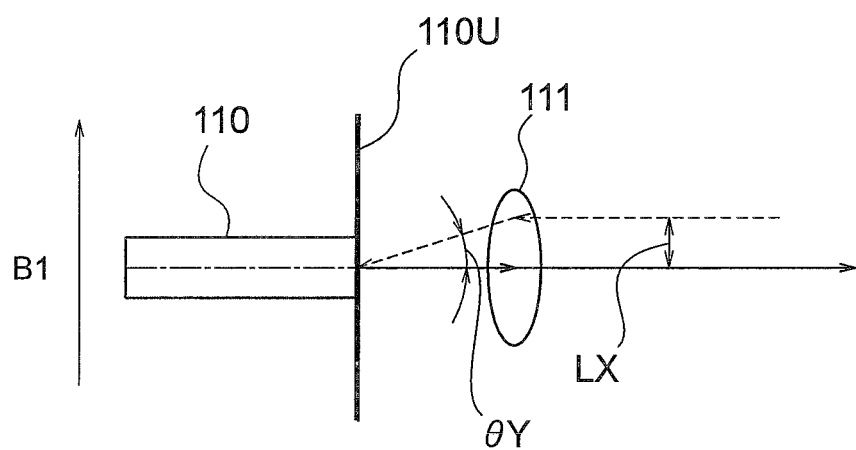
FIG. 8 is an enlarged side view of a portion of FIG. 6 from the first direction.

FIG. 6 is a perspective view of an arrangement of the input/output port 110 and the lens array 111. FIG. 7 is an enlarged side view of a portion of FIG. 6 from the second direction B1. FIG. 8 is an enlarged side view of a portion of FIG. 6 from the first direction A1.

FIGS. 6 to 8 depict a relation between a light launched from the input port 110c of the input/output port 110 and a light that passes to the output port 110e of the input/output port 110.

A U surface 110U is an imaginary surface that is orthogonal to the light launched from each input port of the input/output port 110. As shown in FIGS. 5A and 5B, when the angle of incidence β on the mirror 114m is not zero, the light that passes to the output port 110e is incident with an inclined angle with respect to the U surface 110U in the second direction B1. When the angle of incidence β on the mirror 114m is zero, the light that passes to the output port 110e is incident orthogonally to the U surface 110U in the second direction B1. Assuming an angle of incident light on the U surface 110U to be θ, the angle of incidence θ of the light that passes to the output port 110e increases as the angle of incidence β increases. If the angle of incidence β exceeds a certain value, a position of incidence on the output port 110e is shifted to the second direction B1 by an aberration of the lens array 111, and if the angle of incidence β exceeds further, the input port 110c and the output port 110e are eventually uncoupled.

A coupling efficiency η of the output port 110e when the light propagating to the output port 110e is incident on the U surface 110U with the angle θ is expressed by Equation (3) given below.

$$\eta = \exp(-\pi^2 \omega^2 \theta^2 / \lambda) \quad (3)$$

In Equation (3), ω is a spot size of the light incident on the output port 110e and λ is a wavelength of the incident light.

As can be seen from Equation (3), the coupling efficiency η decreases as the angle θ increases. Assuming an angle of incidence on the output port 110e in the first direction A1 to be θX, and an angle of incidence in the second direction B1 to be θY, an interval P between central axes of the input ports coupled with the output port 110e when θX=0 is expressed by Equation (4) given below.

$$P = LY = f_1 \cdot \tan(2\alpha) \quad (4)$$

When the angle of incidence β assumes a minimum value in a panning range of the mirror 114m, and θX=0 (P=LX), the light from the input port 110c is coupled to the output port 110e with a minimum dissipation loss.

Figure 9:
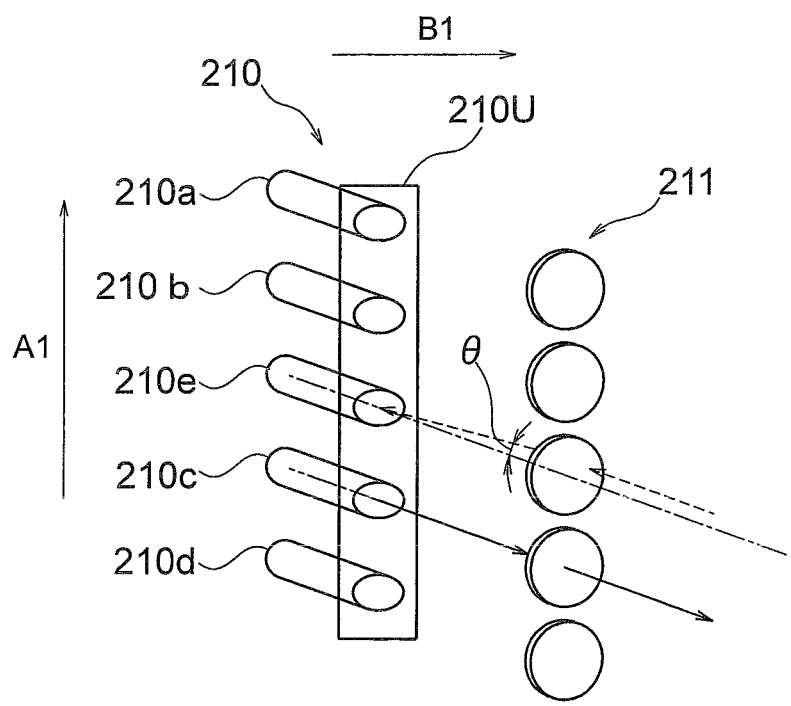
FIG. 9 is a perspective view of an arrangement of an input/output port and a lens array according to a first modification.
Figure 10:
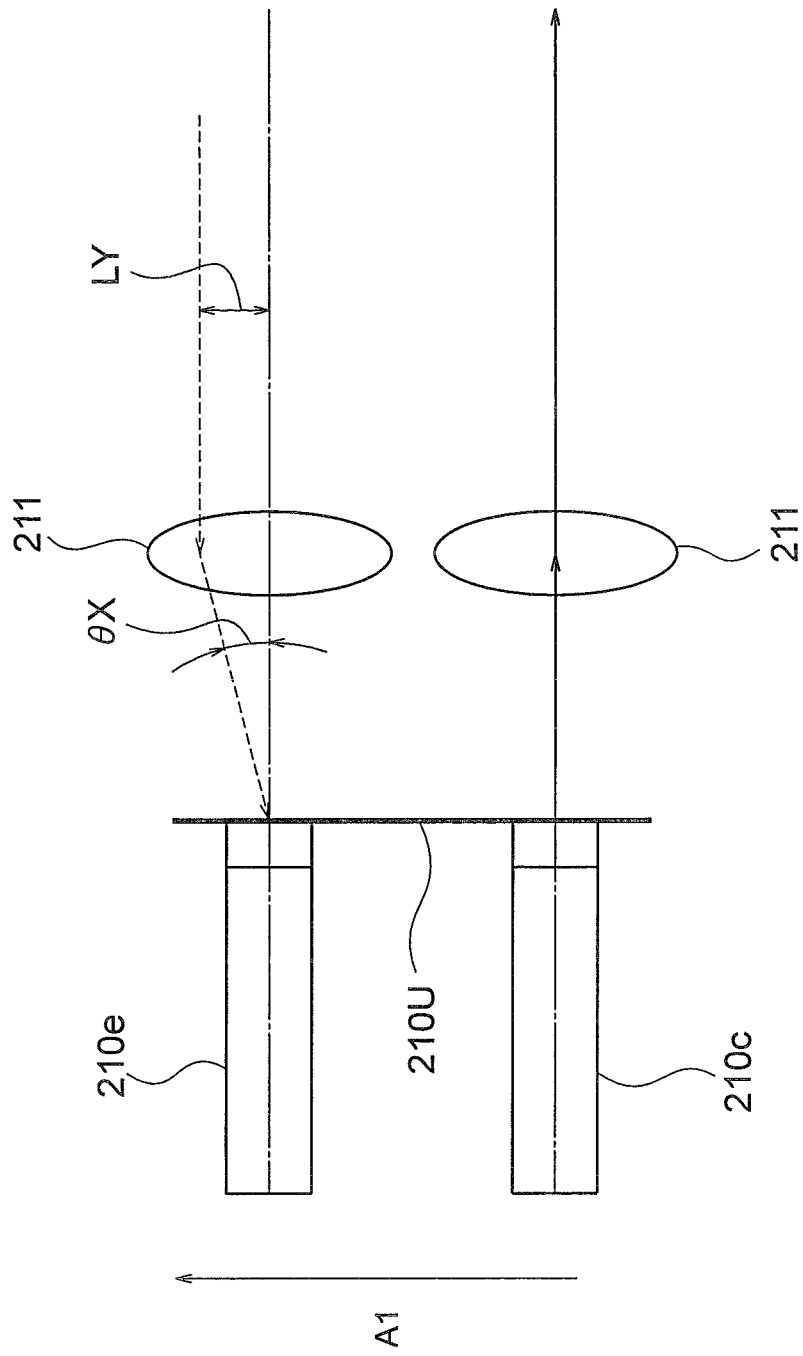
FIG. 10 is an enlarged side view of a portion of FIG. 9 from a second direction.
Figure 11:
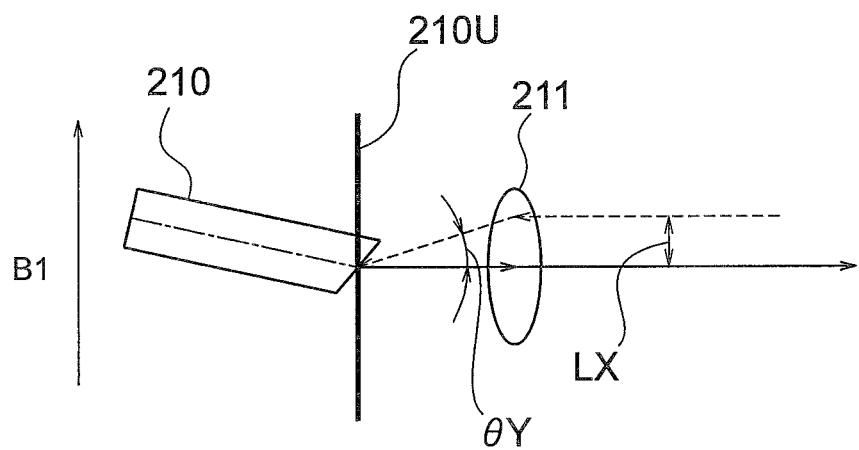
FIG. 11 is an enlarged side view of a portion of FIG. 9 from a first direction.

FIG. 9 is a perspective view of an arrangement of an input/output port 210 and a lens array 211 according to a first modification. FIG. 10 is an enlarged side view of a portion of FIG. 9 from the second direction B1. FIG. 11 is an enlarged side view of a portion of FIG. 9 from the first direction A1.

In the embodiment described above, the light passes from inside of each of the input ports of the input/output port 110, and is launched from an edge surface of the input port. The edge surface of each port of the input/output port 110 on the side of the lens array 111, and a direction of the light that passes from the input port to the output port are mutually orthogonal.

On the contrary, as shown in FIGS. 9, 10, and 11, the input/output port 210 and the lens array 211 can be arranged such that the edge surfaces of the input/output ports of the input/output port 210 on the side of the lens array 211 will be inclined with respect to the passing direction inside input ports 210a, 210b, 210c, 210d, and an output port 210e. Even in the first modification, a U surface 210U is an imaginary surface that is orthogonal to a light launched from each of the input ports of the input/output port 210.

In the wavelength selective switch of the first embodiment, the angles α and β of the incident light can be changed by panning the mirror 114m. The angles θX and θY of incidence on the U surface 110U of the input/output port 110 can be changed by changing the angles of incidence α and β. Accordingly, an intensity of the light output to the output port 110e can be arbitrarily reduced by panning the mirror 114m.

Figure 12:
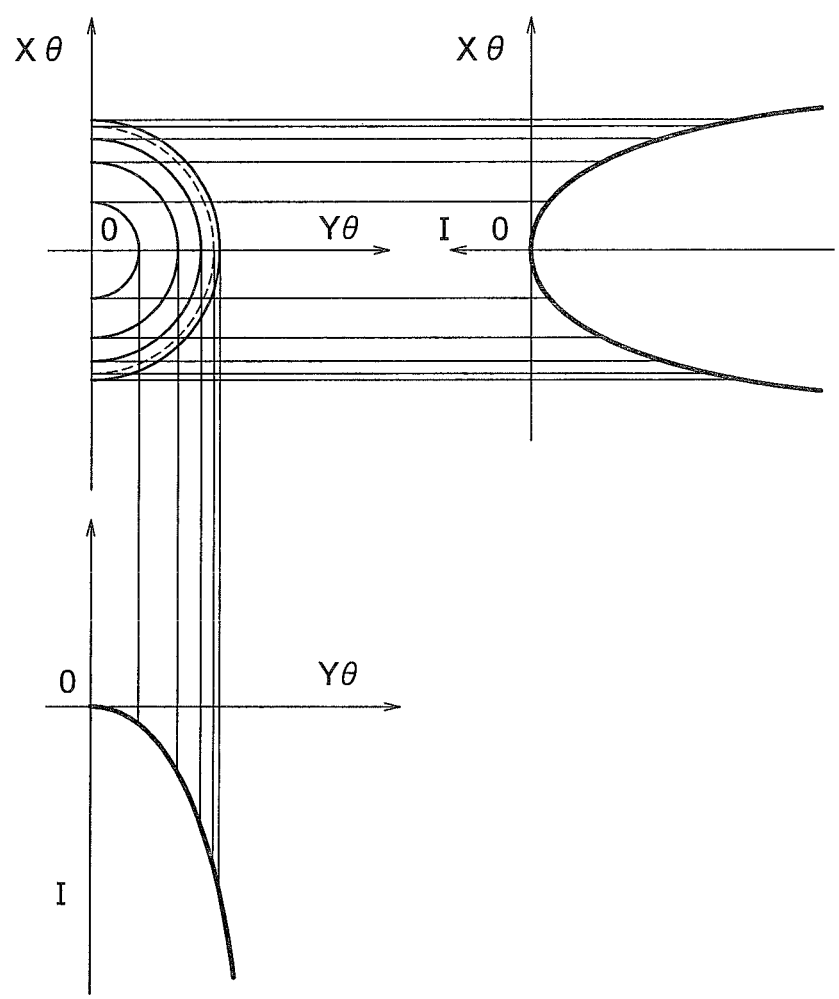
FIG. 12 depicts a distribution of a light intensity I for angles Xθ and Yθ when an angle of the mirror according to the first embodiment is changed.

FIG. 12 depicts a distribution of a light intensity I for the angles Xθ and Yθ when the angle of the mirror 114m is changed. In FIG. 12, the distribution of the light intensity I on the output port is shown when the mirror 114m is panned from the angle θX=0 and angle θY=0 such that the light intensity I will be the maximum in a state in which an arbitrary input port is coupled with the output port. As can be seen from FIG. 12, the light intensity I on the output port can be reduced by rotating the mirror 114m about the axes Xm and/or Ym.

Furthermore, because there are four input ports as shown in FIG. 1, there are also four points for which the interval P between the central axes assumes LX, and as a result, a value of the angle Xθ is different for each of the mirrors 114m even though a value of the angle Yθ is the same. In other words, the arbitrary input port can be coupled to the output port 110e by panning the angle Xθ of the mirror 114m and changing the angle of incidence α.

The wavelength multiplexed light input into each input port of the input/output port 110 has different intensity for each wavelength. The wavelength selective switch has a function (attenuation) to make the intensity of light that differs for each wavelength uniform, multiplex the wavelengths, and output the light from the output port. In the wavelength selective switch according to the first embodiment, the attenuation is realized by changing the panning angle of the mirror 114m complying with the intensity of the lights of each wavelength from a state in which the mirror 114m of the mirror array 114 is panned such that the light intensity is maximum.

A target value of the light intensity to be made uniform for attenuation should be a value below the lowest intensity, and accordingly, the mirror 114m is panned in a large angle for the wavelength having a large intensity difference with the lowest intensity value, and panned in a small angle for the wavelength having a small intensity difference with the lowest intensity value. In other words, a state of performing the attenuation is to pan the mirrors 114m complying with the intensity of each wavelength of the mirrors 114m from the state in which the mirrors 114m are panned such that the light intensity of each mirror 114m is the maximum, and to output the lights with the uniform intensity to the output port 110e. On the other hand, the state in which the attenuation is not performed is to output the lights to the output port 110e with the mirrors 114m panned such that the light intensity of each mirror 114m is the maximum.

Figure 13:
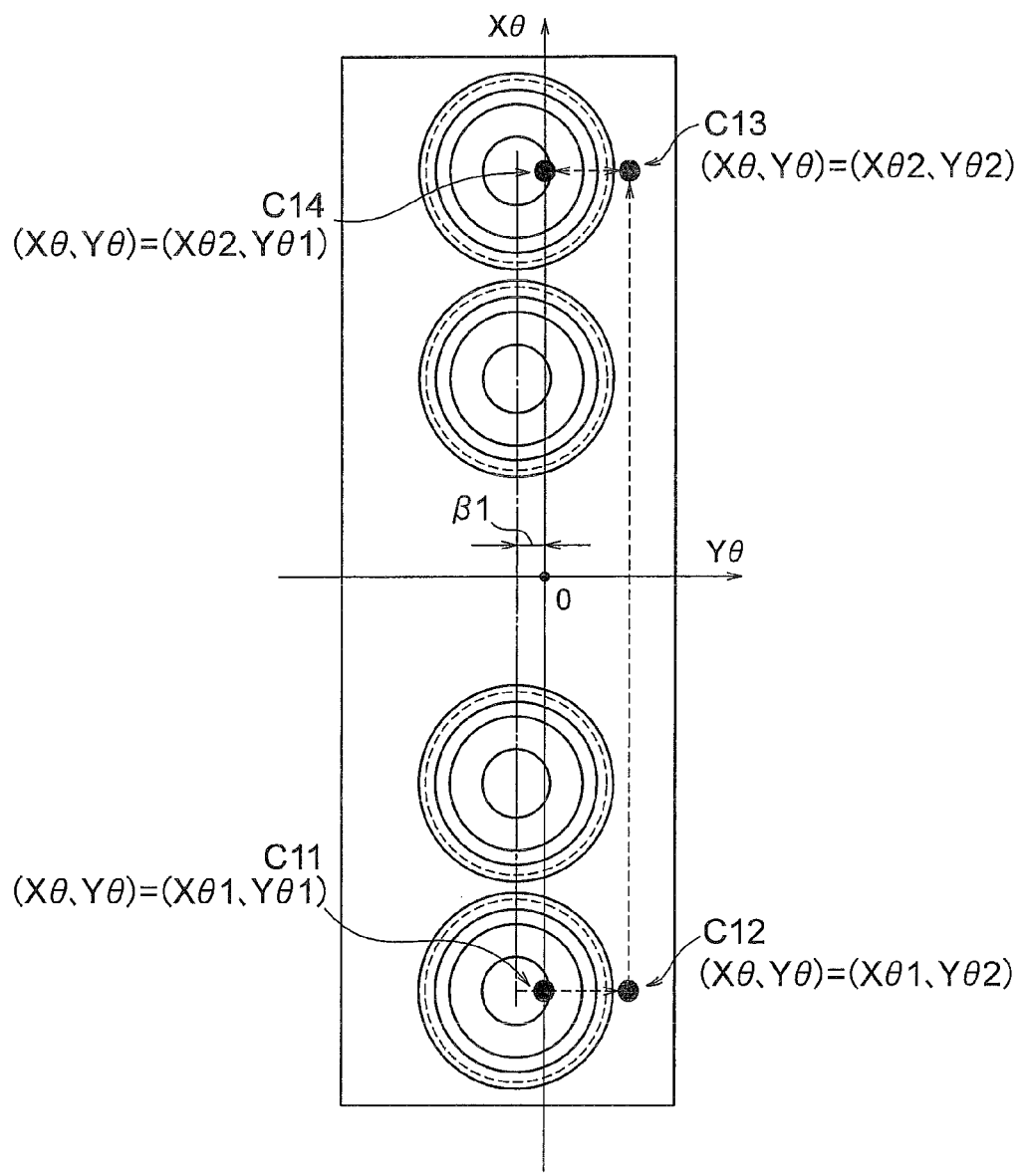
FIG. 13 depicts a relation between the angles Xθ and Yθ of the mirror and the light intensity I of the light incident on an output port according to the first embodiment.
Figure 14A:
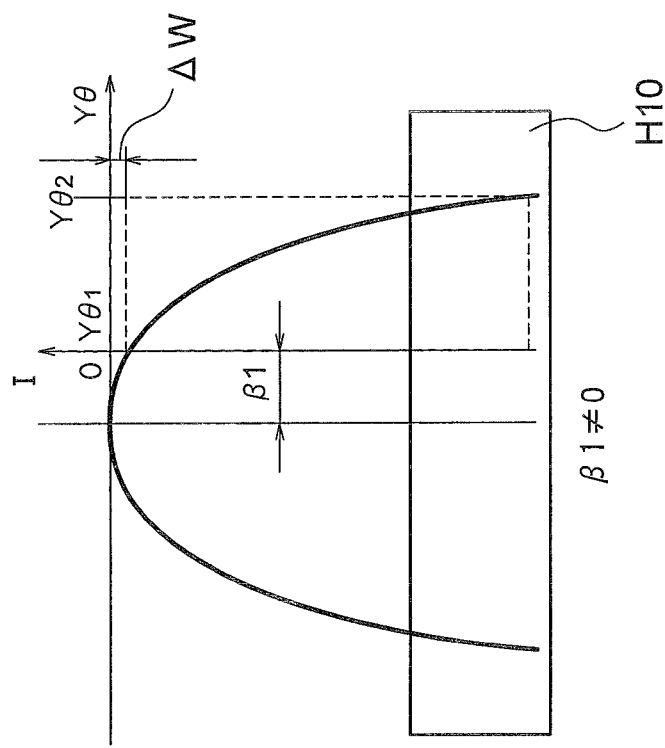
FIGS. 14A and 14B depict a relation between the light intensity I of the light incident on the output port according to the first embodiment, the angle Yθ of the mirror, and a hitless range.
Figure 14B:
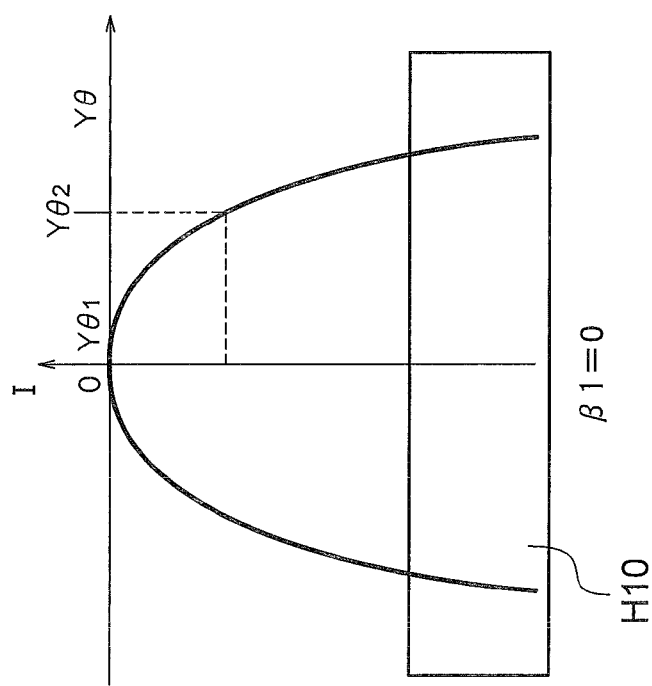

FIG. 13 depicts a relation between the angles Xθ and Yθ of the mirror 114m, and the light intensity I of the light incident on the output port 110e. FIGS. 14A and 14B depict a relation between the light intensity I of the light incident on the output port 110e, the angle Yθ of the mirror 114m, and a hitless allowable range H10. FIG. 14A depicts a comparative example in which a position of the angle Yθ is not offset. FIG. 14B depicts a comparative example in which the position of the angle Yθ is offset.

In the wavelength selective switch of the first embodiment, the position of the angle Yθ for which the light intensity at the output port 110e is maximum (peak position of light intensity distribution) is offset from Yθ1 (Yθ=0) by an angle β1 in a direction opposite to a panning direction of the mirror 114m (FIG. 14B). The panning range of the angle Yθ of the mirror 114m is restricted to be from Yθ1 (Yθ=0) to Yθ2.

By restricting the panning range of the angle Yθ of the mirror 114m to be from Yθ1 (Yθ=0) to Yθ2 as described above, the mirror 114m is not set to a position of the output port 110e where the light intensity is the maximum even though the angle Yθ is changed. This is to prevent the angle of incidence θY on the U surface 110U of the output port 110e from becoming 0.

An arrow with a dotted line shown in FIG. 13 indicates an operation in which a state C11 where the input port 110d and the output port 110e are connected is switched to a state C14 where the input port 110a and the output port 110e are connected, through states C12 and C13. A concrete operation is explained below.

A state in which the intensity of the light connecting the input port 110d and the output port 110e is maximum within the panning range of the mirror 114m is referred to as the state C11, and panning angles of the mirror 114m in this state are Xθ1 and Yθ1. To switch the input port, the mirror 114m is panned from the state C11 to the maximum panning angle in a direction in which the angle Yθ increases by keeping the angle Xθ constant. This state is regarded as the state C12 for which the panning angles of the mirror 114m are Xθ1 and Yθ2.

Subsequently, the angle Xθ of the mirror 114m is panned in the direction of the input port 110a by keeping the angle Yθ of the mirror 114m constant. A panning value ΔXθ is expressed by Equation (5) shown below when an interval between the central axes of the input ports 110a and 110d is $L_{10}$a-d.

$$\Delta X\theta = \tan^{-1}(L_{10}a\text{-}d/f_1)/2 \tag{5}$$

A state in which the mirror 114m is panned by an angle ΔXθ is regarded as the state C13 and panning angles in this state are Xθ2 and Yθ2.

Next, the angle Yθ of the mirror 114m is panned to the angle Yθ1 in a direction in which the panned angle of the mirror 114m is decreased by keeping the angle Xθ of the mirror 114m unchanged. This state is regarded as the state C14 and the panning angles in this state are Xθ2 and Yθ1.

By offsetting the position of the angle Yθ that corresponds to the maximum light intensity, by the angle β1, the hitless operation can be performed within the hitless allowable range in which the light intensity is less than or equal to the allowable value, when moving to the states C12 and C13 that is performed during the hitless operation.

If the angle β1 is considered as zero as shown in a conventional structure in FIG. 14A, the light intensity I cannot reach within the hitless allowable range H10 even if the mirror 114m is panned to the maximum panning angle Yθ2 of the mirror 114*m*. On the other hand, if the angle β1 is not zero as shown in a structure of the first embodiment in FIG. 14B, the light intensity I sufficiently reaches within the hitless allowable range H10 when the mirror 114*m* is panned to the maximum panning angle Yθ2 of the mirror 114*m*.

If offsetting is performed as shown in FIG. 14B, the light intensity I at the minimum panning angle Yθ1 decreases by a decrement amount ΔW as compared to a case in which offsetting is not performed. However, because a spot diameter condensed on the mirror 114*m* is sufficiently small, the decrement amount ΔW becomes small. Thus, a decrease by the decrement amount ΔW causes no practical problem.

Even in the conventional structure shown in FIG. 14A, it is possible to reach the hitless allowable range H10 by increasing the maximum panning angle Yθ2 of the mirror 114*m*. However, increasing the maximum panning angle Yθ2 is difficult with the structure of the mirror array 114.

Figure 15:
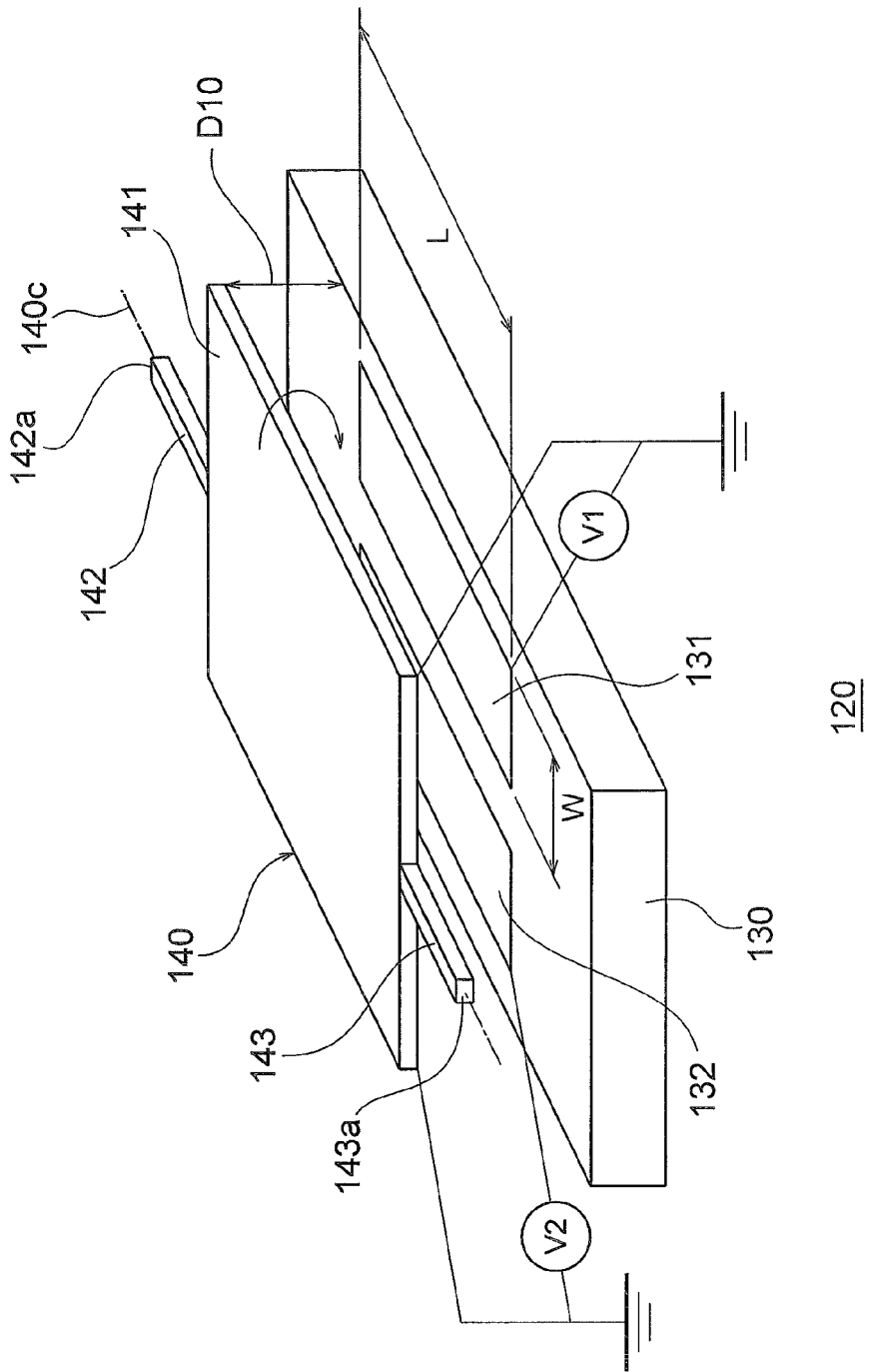
FIG. 15 is a perspective view of a structure of an MEMS mirror according to the first embodiment.
Figure 16A:
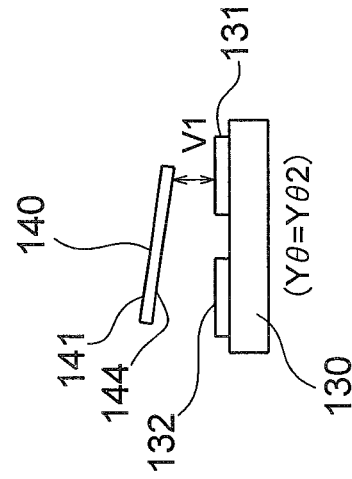
FIGS. 16A and 16B are side views from a direction of an axis shown in FIG. 15.
Figure 16B:
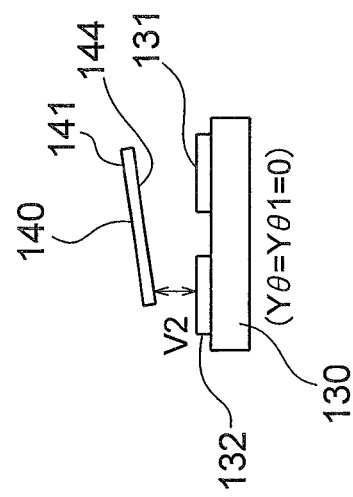

The mirror 114*m* of the mirror array 114 of the first embodiment is, for example, formed of MEMS (Micro Electro Mechanical Systems) mirrors shown in FIG. 15 and an electrostatic driving method is adopted. FIG. 15 is a perspective view of a structure of an MEMS mirror 120. FIGS. 16A and 16B are side views from a direction of an axis 140*c* shown in FIG. 15. FIG. 16A depicts a state when the angle Yθ is Yθ1 and FIG. 16B depicts a state when the angle Yθ is Yθ2. The angles Yθ1 and Yθ2 are different from each other.

A driving principle and features of the electrostatic drive type MEMS mirror 120 are explained below with reference to FIGS. 15, 16, and 16B.

The MEMS mirror 120 includes a movable plate 140 having a reflective surface 141 on an upper surface, and a substrate 130 having a pair of driving electrodes 131 and 132 formed thereon.

The movable plate 140 that has an oblong plate shape includes a pair of hinges 142 and 143 that extend outward from both end faces in a longitudinal direction. The hinges 142 and 143 are supported by not shown supporting tools, and can be inclined by rotating about the axis 140*c* that passes through the hinges 142 and 143.

Each of the driving electrodes 131 and 132 that are formed on the upper surface of the substrate 130 has a length L and a width W. The driving electrodes 131 and 132 face toward a bottom surface 144 of the movable plate 140 (FIGS. 16A and 16B), and are arranged at positions that are target for the axis 140*c*. An interval, i.e., an electrostatic gap D10, is provided between the movable plate 140 and the driving electrodes 131 and 132.

The bottom surface 144 of the movable plate 140 has electric conductivity and a driving voltage V1 can be applied between the bottom surface 144 and the driving electrode 131. Furthermore, a driving voltage V2 can be applied between the bottom surface 144 and the driving electrode 132 independently from the driving voltage V1. When neither of the driving voltages V1 and V2 is applied, the bottom surface 144 of the movable plate 140 is maintained at a constant potential (GND potential). In this case, the movable plate 140 and the driving electrodes 131 and 132 are parallel to each other.

A driving method of the MEMS mirror 120 shown in FIGS. 15, 16A, and 16B is explained below.

When the driving voltage V1 is applied to the driving electrode 131 in a state in which the movable plate 140 is inclined towards the driving electrode 131, an electrostatic attractive force F is generated between the movable plate 140 and the driving electrode 131. As a result, the movable plate 140 rotates about the axis 140*c* and the movable plate 140 on the side of the driving electrode 131 inclines towards the driving electrode 131 (FIG. 16B).

When the driving voltage V2 is applied to the driving electrode 132 in a state in which the movable plate 140 is inclined towards the driving electrode 132, the electrostatic attractive force F is generated between the movable plate 140 and the driving electrode 132. As a result, the movable plate 140 rotates about the axis 140*c* and the movable plate 140 on the side of the driving electrode 132 inclines towards the driving electrode 132 (FIG. 16A).

Equation (6) given below holds good for the driving voltage V1 and the electrostatic attractive force F.

$$F=(\epsilon_0 \cdot W \cdot L \cdot V1^2)/d^2 \qquad (6)$$

where $\epsilon_0$ is a relative permittivity, W is the width of the driving electrode 131, L is the length of the driving electrode 131, and d is a width of the electrostatic gap D10.

If the driving voltage V1 is replaced with the driving voltage V2, Equation (6) holds good for the electrostatic attractive force F between the movable plate 140 and the driving electrode 132.

As can be seen from Equation (6), increasing a driving electrode area (W×L), decreasing the electrostatic gap D10, and increasing the driving voltage V1 would be beneficial for acquiring a large electrostatic attractive force F.

A method to obtain a large panning angle is studied next.

First, decreasing the electrostatic gap D10 is not beneficial because the panning range of the movable plate 140 is reduced. Furthermore, because the driving electrode 131 should face the movable plate 140 and a size of the movable plate 140 is determined by a size of the reflective surface set as per the specifications, there are limitations for obtaining a large panning angle by increasing the driving electrode area. In addition, because the application of high driving voltage causes electrostatic destruction or insulation destruction in the electrostatic gap D10, there are limitations for obtaining a large panning angle by increasing the driving voltage.

Thus, it is desirable to realize the large panning angle in the MEMS mirror array for the wavelength selective switch; however, there are limitations in obtaining the large panning angle by increasing the electrostatic attractive force for the electrostatic drive type MEMS mirror.

Another approach to achieve a large panning angle is to reduce rigidity of the hinges 142 and 143. If the rigidity of the hinges 142 and 143 regarding a movement around the axis 140*c* is reduced, a large panning angle can be obtained with a small force. However, the rigidity of the hinges 142 and 143 has an influence on the shock resistance that is one of the requirements of the mirror array 114 and because the rigidity of the hinges 142 and 143 is designed so as to satisfy the shock resistance, reducing the rigidity of the hinges 142 and 143 to obtain the large panning angle is difficult.

As described above, obtaining a large panning angle for the electrostatic MEMS mirror array is difficult. A mirror array required for the wavelength selective switch in the first embodiment is of a two-dimensional driving type instead of a one-dimensional driving type; however, the same problems occur when obtaining a large panning angle. However, in the wavelength selective switch according to the first embodiment, even if there are limitations on the width of the panning angle of the mirror as described above, the hitless operation can be realized without increasing the panning angle.

Figure 17:
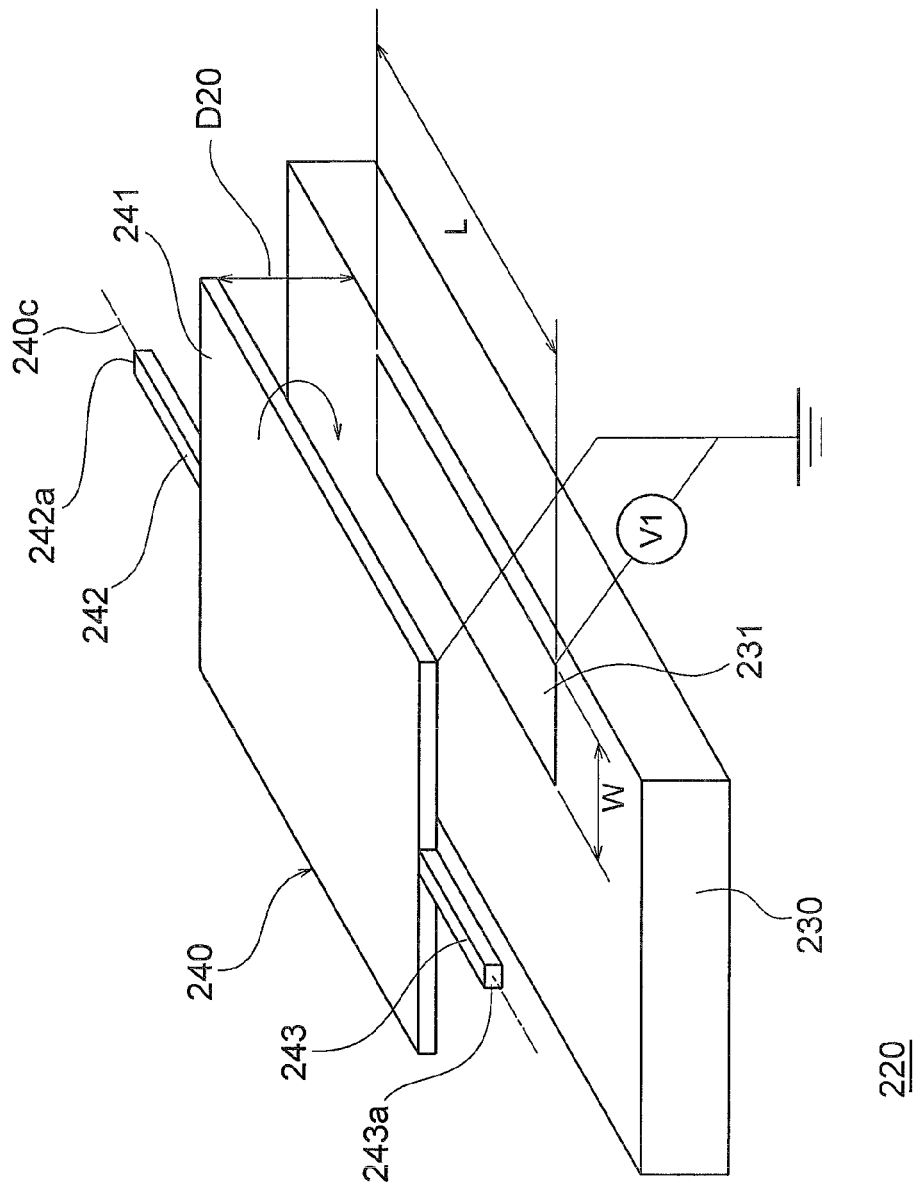
FIG. 17 is a perspective view of a structure of an MEMS mirror according to a second modification.

FIG. 17 is a perspective view of a structure of an MEMS mirror 220 according to a second modification. FIGS. 18A and 18B are side views from a direction of an axis 240*c* shown in FIG. 17. FIG. 18A depicts a state when the angle Yθ is Yθ1 and FIG. 18B depicts a state when the angle Yθ is Yθ2.

As shown in FIGS. 17, 18A, and 18B, the second modification differs from the first embodiment described above in that it includes only one driving electrode and a mirror is panned only in one direction. As a concrete structure, the MEMS mirror 220 includes a movable plate 240 having a reflective surface 241 on an upper surface, and a substrate 230 having a single driving electrode 231 formed thereon. Similar to the movable plate 140 described above, the movable plate 240 that has an oblong plate shape includes a pair of hinges 242 and 243 that extend outward from both end faces in a longitudinal direction. The hinges 242 and 243 can be inclined by rotating about the axis 240c that passes through the hinges 242 and 243. The driving electrode 231 has a length L and a width W and that faces toward a bottom surface 244 of the movable plate 240 (FIGS. 18A and 18B). An electrostatic gap D20 is provided between the movable plate 240 and the driving electrode 231.

The bottom surface 244 of the movable plate 240 has electric conductivity and the driving voltage V1 can be applied between the bottom surface 244 and the driving electrode 231. When the driving voltage V1 is not applied, the bottom surface 244 of the movable plate 240 is maintained at a constant potential (GND potential). When the driving voltage V1 is applied to the driving electrode 231, the electrostatic attractive force F is generated between the movable plate 240 and the driving electrode 231. As a result, the movable plate 240 rotates about the axis 240c and the movable plate 240 on the side of the driving electrode 231 inclines towards the driving electrode 231 (FIG. 18B).

Even if driving areas in which mirrors are panned are different, in the embodiment described above, because the angle β1 can be arbitrarily set, the hitless operation can be easily realized. In the first embodiment, there are limitations only on a width of the panning angle and not on absolute values of the panning angles Yθ1 and Yθ2 of the mirror. Therefore, designing of the mirror becomes easier and advantages such as downsizing of the mirror, reduction in a cost of the mirror, reduction in power consumption for mirror driving, and increase in a width of the mirror panning angle can be easily envisaged.

Figure 19:
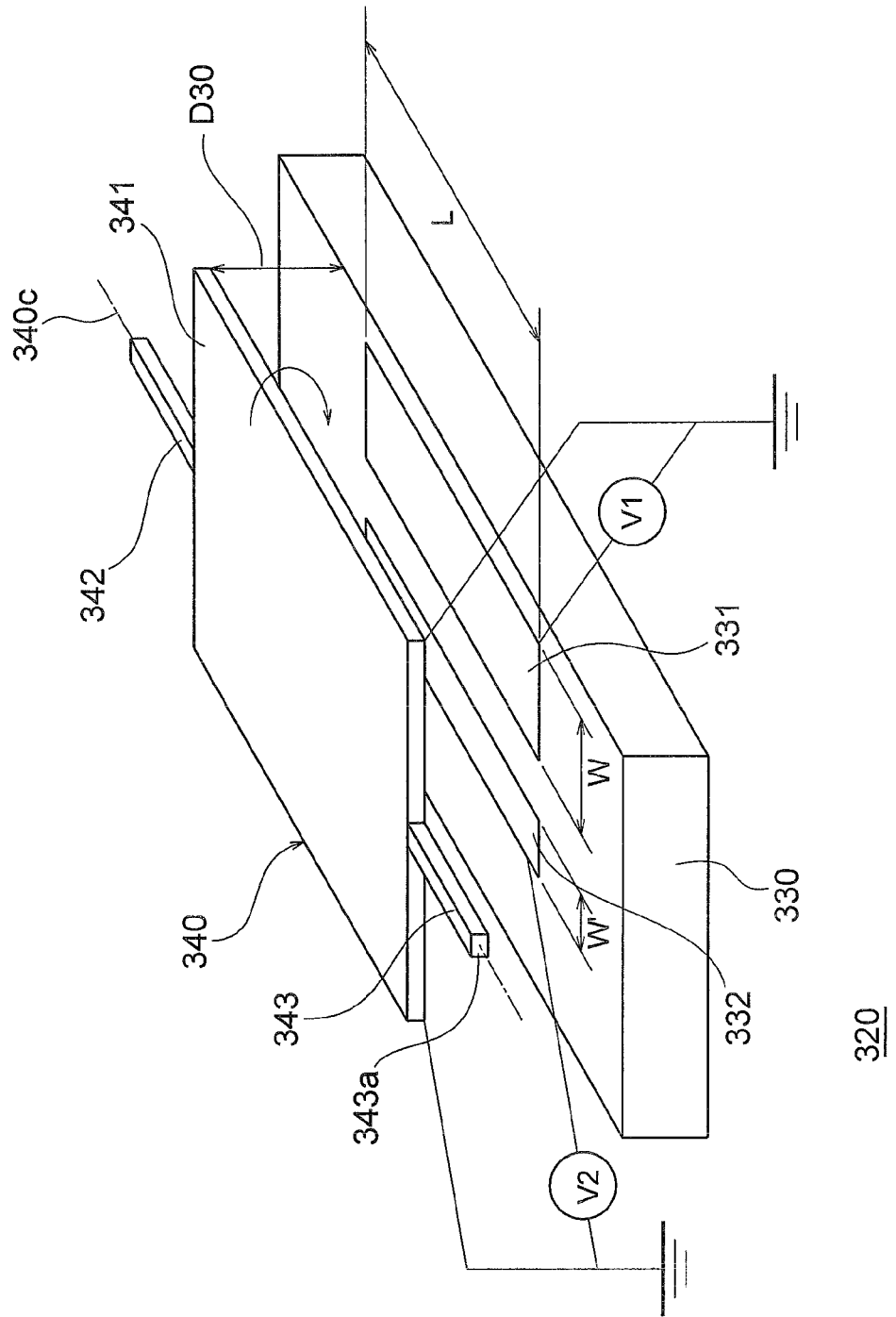
FIG. 19 is a perspective view of a structure of an MEMS mirror according to a third modification.
Figure 20A:
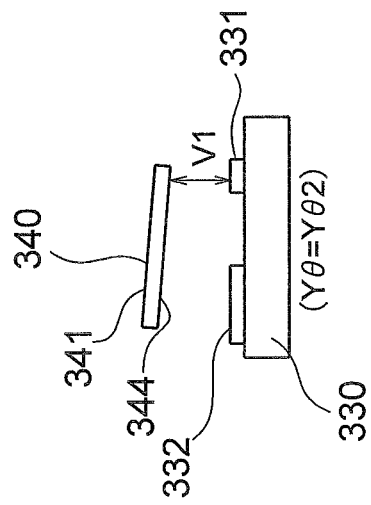
FIGS. 20A and 20B are side views from a direction of an axis shown in FIG. 19.
Figure 20B:
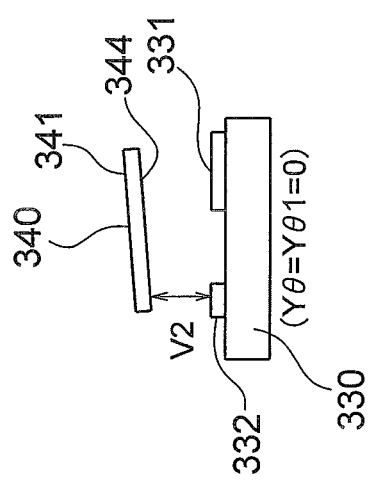

FIG. 19 is a perspective view of a structure of an MEMS mirror 320 according to a third modification. FIGS. 20A and 20B are side views from a direction of an axis 340c shown in FIG. 20A depicts a state when the angle Yθ is Yθ1 and FIG. 20B depicts a state when the angle Yθ is Yθ2.

As shown in FIGS. 19, 20A, and 20B, the third modification differs from the first embodiment in that a left and right driving electrodes are of different sizes and mirror panning ranges for the left and right driving electrodes are different. As a concrete structure, the MEMS mirror 320 includes a movable plate 340 having a reflective surface 341 on an upper surface, and a substrate 330 having two driving electrodes 331 and 332 formed thereon. Similar to the above-described movable plate 140, the movable plate 340 that has an oblong plate shape includes a pair of hinges 342 and 343 that extend outward from both end faces in a longitudinal direction, and the hinges 342 and 343 can be inclined by rotating about the axis 340c passing through the hinges 342 and 343. The driving electrode 331 has a length L and a width W, and the driving electrode 332 has a length L and a width W' that is narrower than the width W. The driving electrodes 331 and 332 face toward a bottom surface 344 (FIGS. 20A and 20B) of the movable plate 340. An electrostatic gap D30 is provided between the movable plate 340 and the driving electrode 331.

The bottom surface 344 of the movable plate 340 has electric conductivity and the driving voltages V1 and V2 can be, respectively, applied between the bottom surface 344 and the driving electrode 331, and between the bottom surface 344 and the driving electrode 332. When neither of the driving voltages V1 and V2 is applied, the bottom surface 344 of the movable plate 340 is maintained at a constant potential (GND potential) When the driving voltage V1 is applied to the driving electrode 331, the electrostatic attractive force F is generated between the movable plate 340 and the driving electrode 331. As a result, the movable plate 340 rotates about the axis 340c and the movable plate 340 on the side of the driving electrode 331 inclines towards the driving electrode 331 (FIG. 20B). When the driving voltage V2 is applied to the driving electrode 332, the electrostatic attractive force F is generated between the movable plate 340 and the driving electrode 332. As a result, the movable plate 340 rotates about the axis 340c and the movable plate 340 on the side of the driving electrode 332 inclines towards the driving electrode 332 (FIG. 20A).

Even if driving areas in which mirrors are panned are different, in the embodiment described above, because the angle β1 can be arbitrarily set, the hitless operation can be easily realized. In the first embodiment, there are limitations only on the width of the panning angle and not on the absolute values of the panning angles Yθ1 and Yθ2 of the mirror. Therefore, designing of the mirror becomes easier and advantages such as downsizing of the mirror, reduction in the cost of the mirror, reduction in power consumption for mirror driving, and increase in the width of the mirror panning angle can be easily envisaged.

Figure 21:
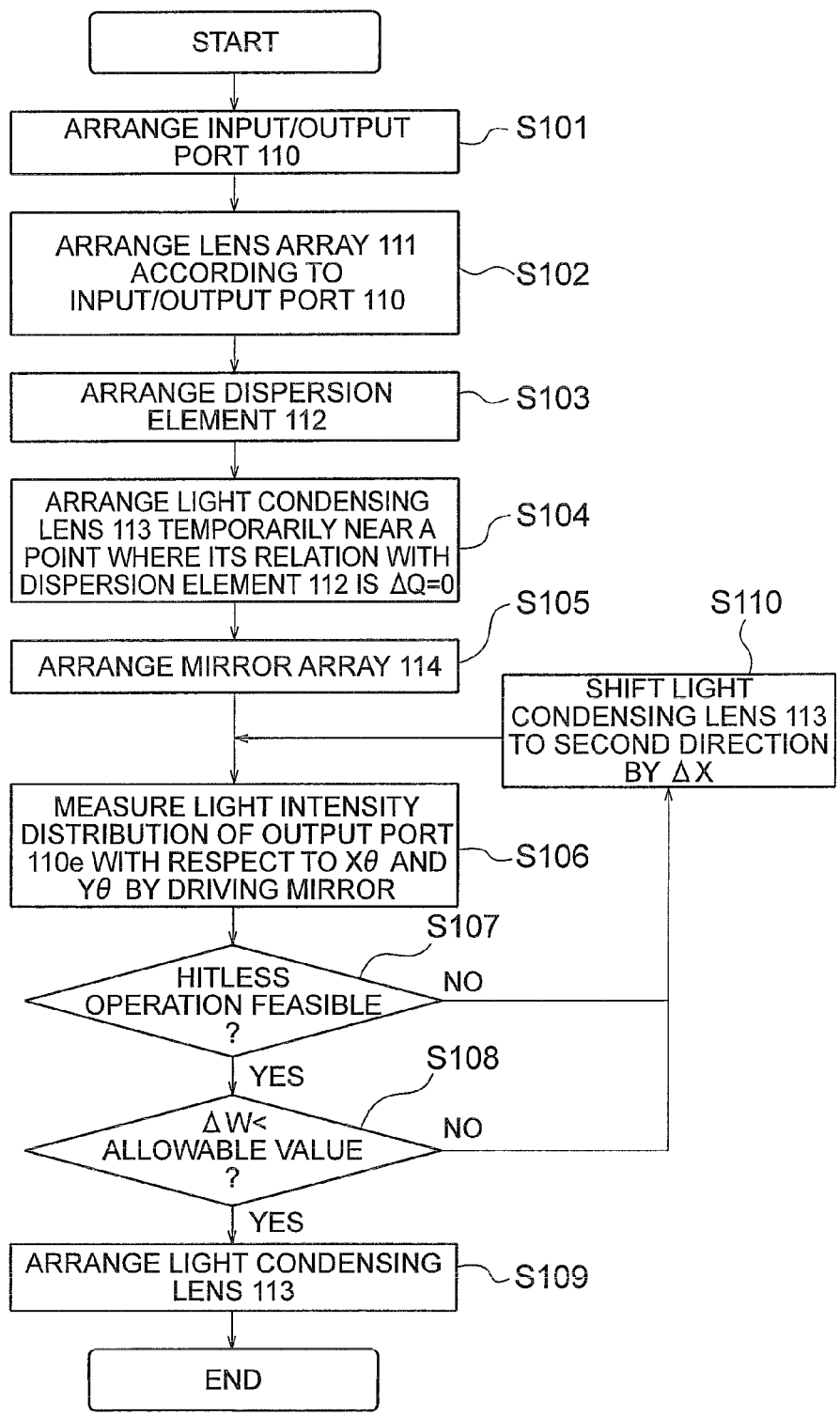
FIG. 21 is a flowchart of an example of an assembling process of the wavelength selective switch according to the first embodiment.
Figure 22:
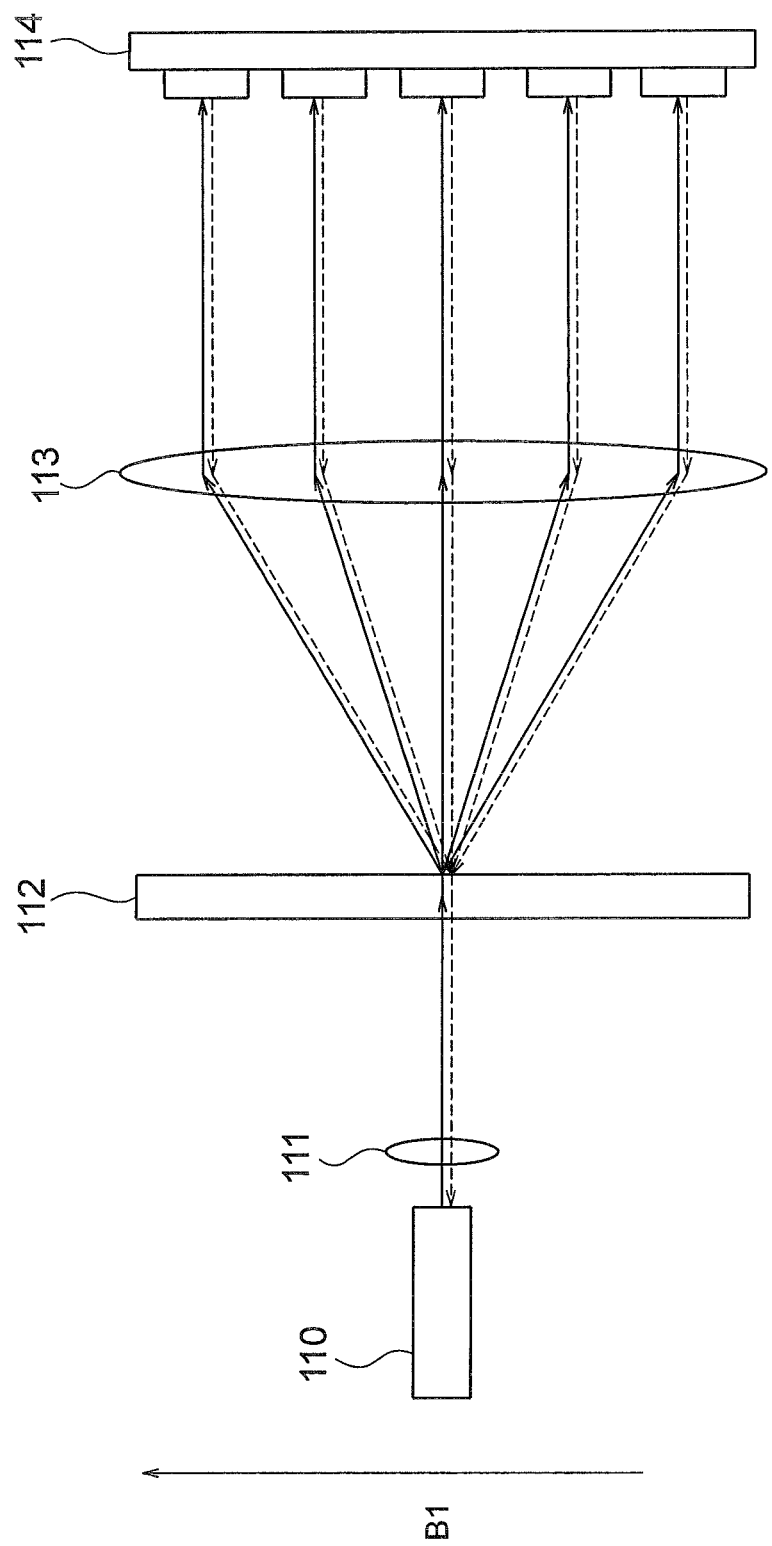
FIG. 22 is a drawing that depicts, from among the assembling process of the wavelength selective switch according to the first embodiment, a state in which the light condensing lens is arranged.
Figure 23:
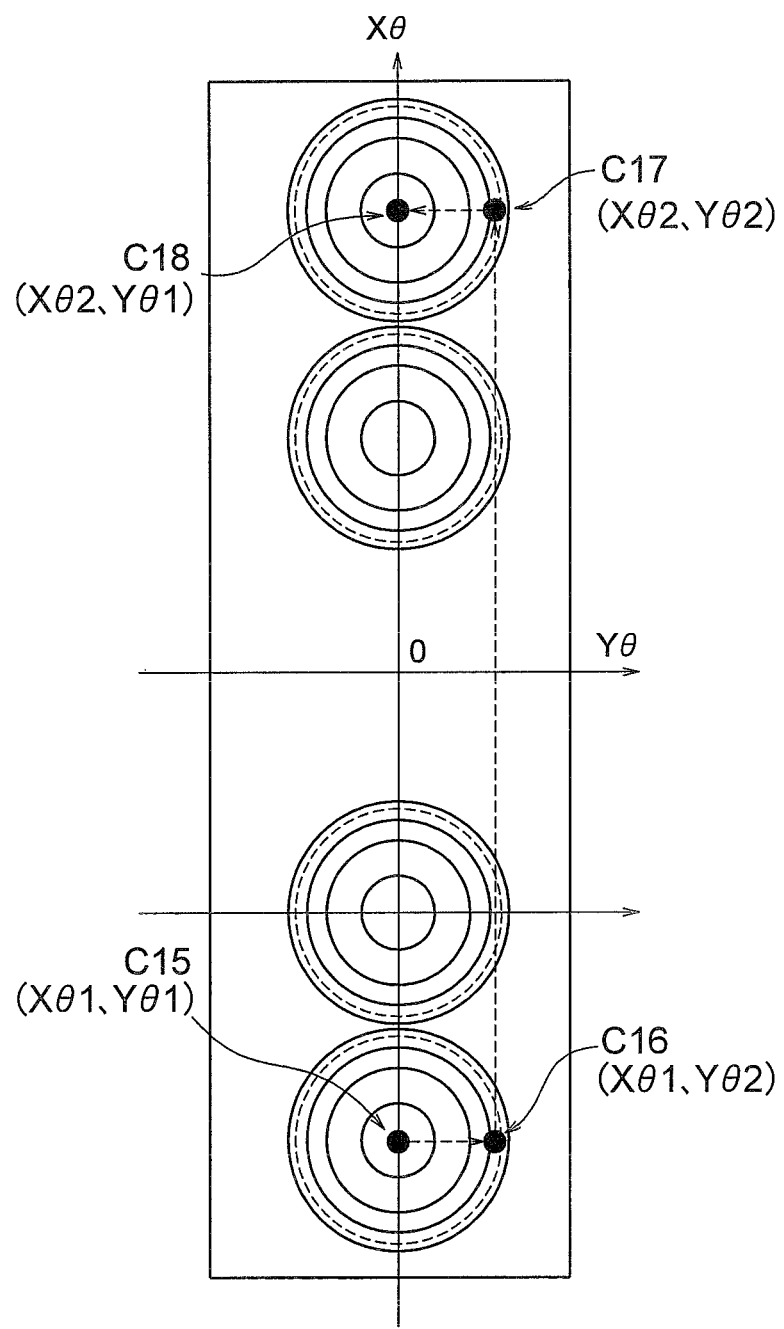
FIG. 23 is a drawing that depicts, from among the assembling process of the wavelength selective switch according to the first embodiment, a state in which a distribution of a light intensity at the output port is being measured.

An assembling of the wavelength selective switch according to the first embodiment is explained below with reference to FIGS. 21 to 23. FIG. 21 is a flowchart of an example of an assembling process of the wavelength selective switch according to the first embodiment. FIG. 22 is a drawing that depicts, from among the assembling process of the wavelength selective switch according to the first embodiment, a state in which the light condensing lens 113 is arranged. FIG. 23 is a drawing that depicts, from among the assembling process of the wavelength selective switch according to the first embodiment, a state in which a distribution of the light intensity of the output port 110e is being measured by driving the mirror array 114.

First, the input/output port 110 is arranged at a predetermined position (Step S101) and the lens array 111 is arranged according to the input/output port 110 (Step S102). Furthermore, the dispersion element 112 is arranged at a predetermined position (Step S103). The light condensing lens 113 is temporarily arranged such that a value of ΔQ, which indicates a positional relation between the dispersion point P1 (FIG. 3) where the lights are dispersed by the dispersion element 112 for each wavelength and the light condensing lens 113, will be 0 (Step S104).

Next, after arranging the mirror array 114 to a predetermined position (Step S105), the mirror 114m of the mirror array 114 is driven, the panning angles Xθ and Yθ are changed, as shown in FIG. 23, in a sequence of (Xθ1, Yθ1) (state C15), (Xθ1, Yθ2) (state C16), (Xθ2, Yθ2) (state C17), and (Xθ2, Yθ1) (state C18), and the distribution of the light intensity of the output port 110e in each state is measured (Step S106). A feasibility of the hitless operation is determined from the measured light intensity distribution (Step S107). If the hitless operation is feasible (YES at Step S107), it is confirmed that the decrement amount ΔW of the maximum light intensity is less than an allowable value (Step S108).

If the hitless operation is not feasible (NO at Step S107), the light condensing lens 113 is shifted to the second direction B1 by a shift amount ΔX to increase the angle β1. However, the shift amount ΔX should be chosen such that the decrement amount ΔW is not greater than or equal to the allowable value. If the decrement amount ΔW is greater than or equal to the allowable value (NO at Step S108), the light condensing lens 113 is shifted to the second direction B1 by the shift amount ΔX to decrease the angle β1, and the shift amount ΔX is shifted within the hitless allowable range. Thereafter, again, the mirror is driven and the angles Xθ and Yθ and the light intensity distribution of the output port 110e are measured. Thereafter, steps such as determining whether the hitless operation is feasible (Step S107) and determining whether the decrement amount ΔW is less than the allowable value (Step S108) are performed.

If the decrement amount ΔW is less than the allowable value (YES at Step S108), the light condensing lens 113 is actually arranged and the assembling process is completed.

Thus, Steps S106 to S108 are repeated until the hitless operation is feasible and the decrement amount ΔW is less than the allowable value; however, because the shift amount ΔX can be anticipated from the designed value, the number of repetitions can be performed for less number of times, that is, two to three times. By adopting the assembling process described above, assembling can be performed easily, in a shorter time, and with higher precision without using a special assembling device.

To complete the assembling, the decrement amount ΔW of the maximum light intensity should be equal to the allowable value or less than or equal to the allowable value. However, if the angle β1 is considered as an angle β1max when the decrement amount ΔW is equal to the allowable value, the angle β1max varies depending on the spot diameter of the light condensed on the mirror 114m. The spot diameter of the light condensed on the mirror 114m is diversified depending on the precision of the parts and the assembling process. Accordingly, it is extremely difficult to design and assemble the wavelength selective switch without using an adjustment mechanism and with the angle β1max as a fixed value, and even if designing and assembling are feasible, a large margin amount is likely to get deducted from the angle β1max. In the wavelength selective switch according to the first embodiment, because the angle β1max can be set in the actual wavelength selective switch, the margin amount need not be considered and the margin amount can be used for the panning angle width of the mirror. Thus, the hitless operation can be realized even when the spot diameter is smaller. Moreover, because the angle β1max can be set by calibration, one mirror array 114 can be applied to various types of wavelength selective switches.

Figure 24:
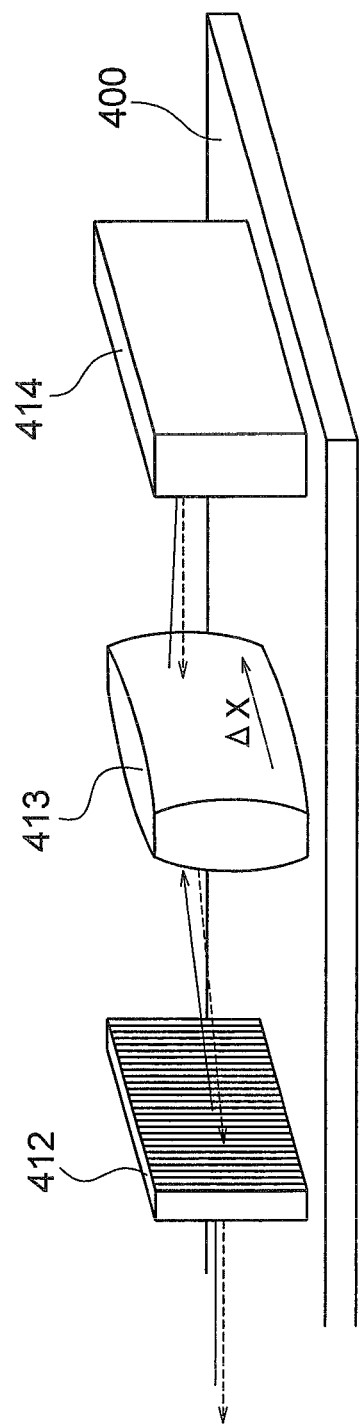
FIG. 24 is a perspective view of structures of a dispersion element, a light condensing lens, and a mirror array according to a fourth modification.

FIG. 24 is a perspective view of structures of a dispersion element 412, a light condensing lens 413, and a mirror array 414 according to a fourth modification.

As shown in FIG. 24, a surface shape of the light condensing lens 413 viewed from a direction of an optical axis can be changed to a substantially rectangular shape instead of a circular shape. Furthermore, the dispersion element 412 and the mirror array 414 also have a substantially rectangular shape similar to that of the light condensing lens 413, and are placed on the same plane surface 400. As a result, the light condensing lens 413 can be easily moved to the second direction B1 during the assembling process with high precision.

Second Embodiment

Figure 25:
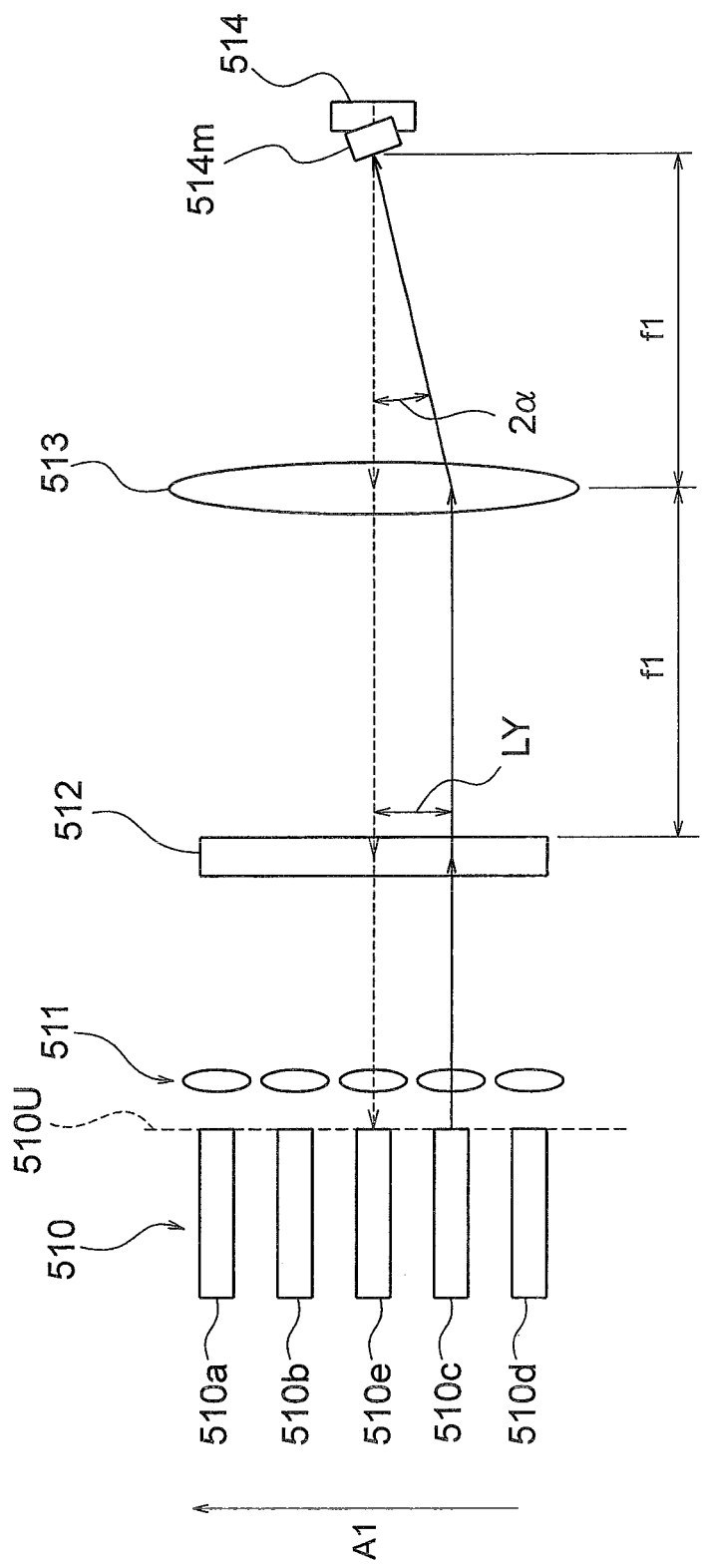
FIG. 25 is a side view of a structure of a wavelength selective switch according to a second embodiment.
Figure 26:
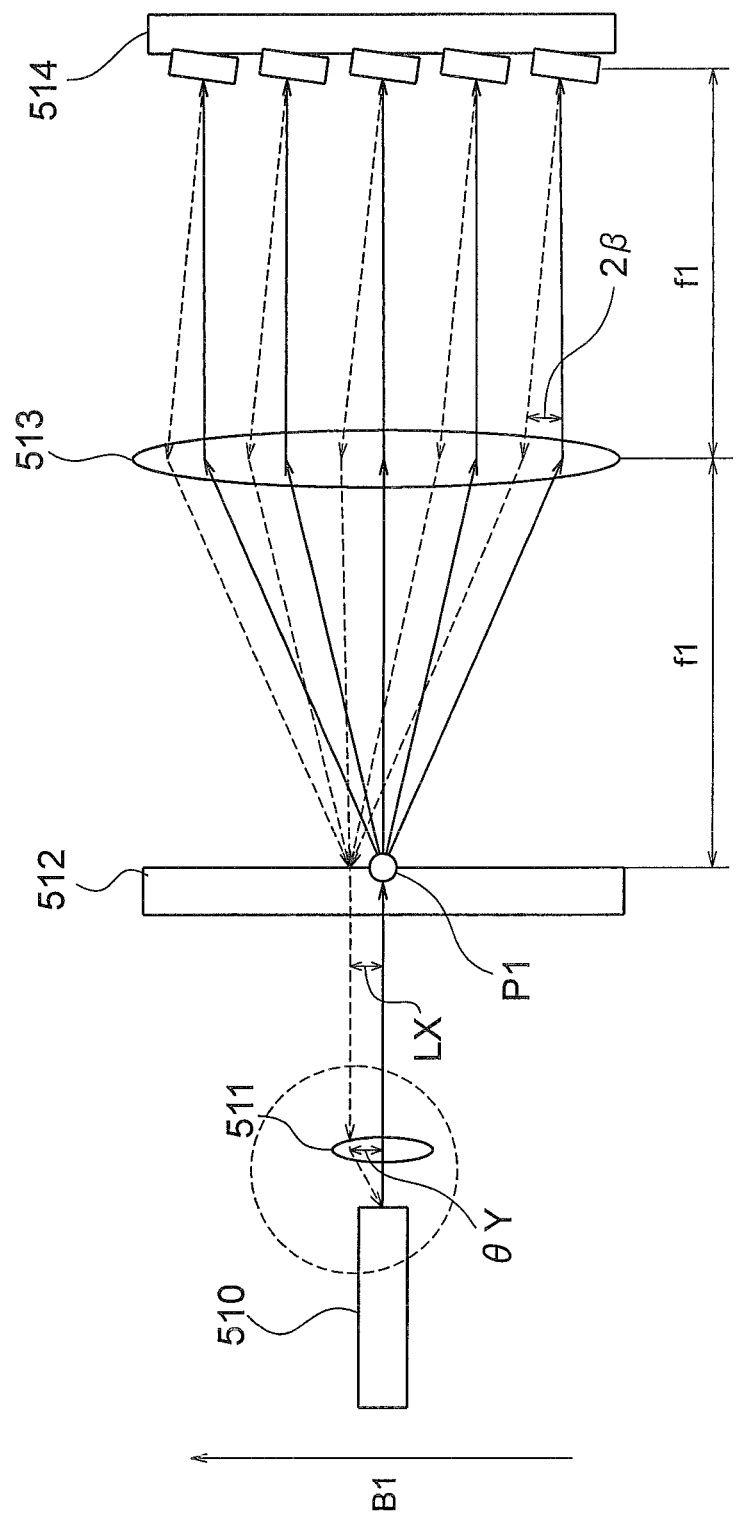
FIG. 26 is a top view of the structure of the wavelength selective switch according to the second embodiment.
Figure 27:
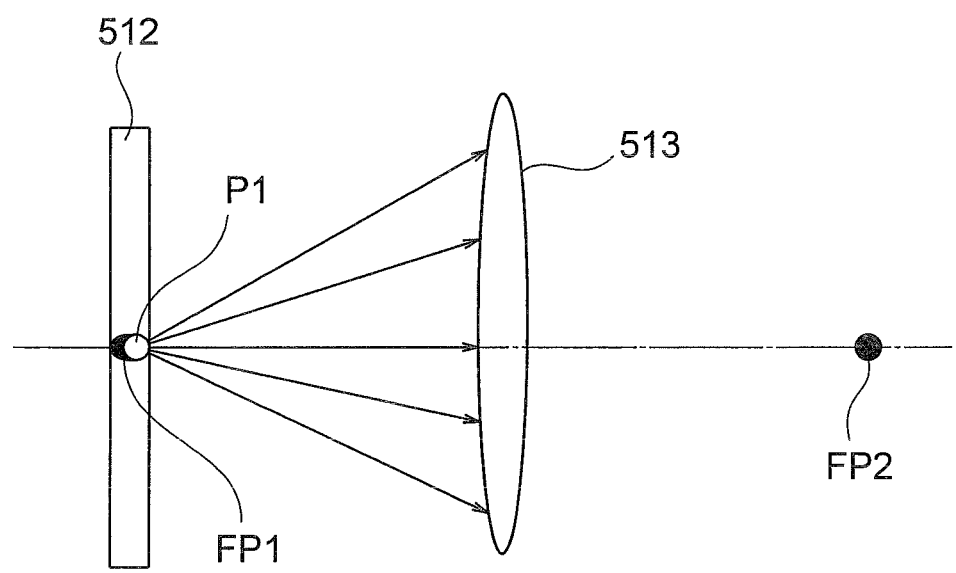
FIG. 27 is an enlarged view of a dispersion element and a light condensing lens shown in FIG. 26.
Figure 28:
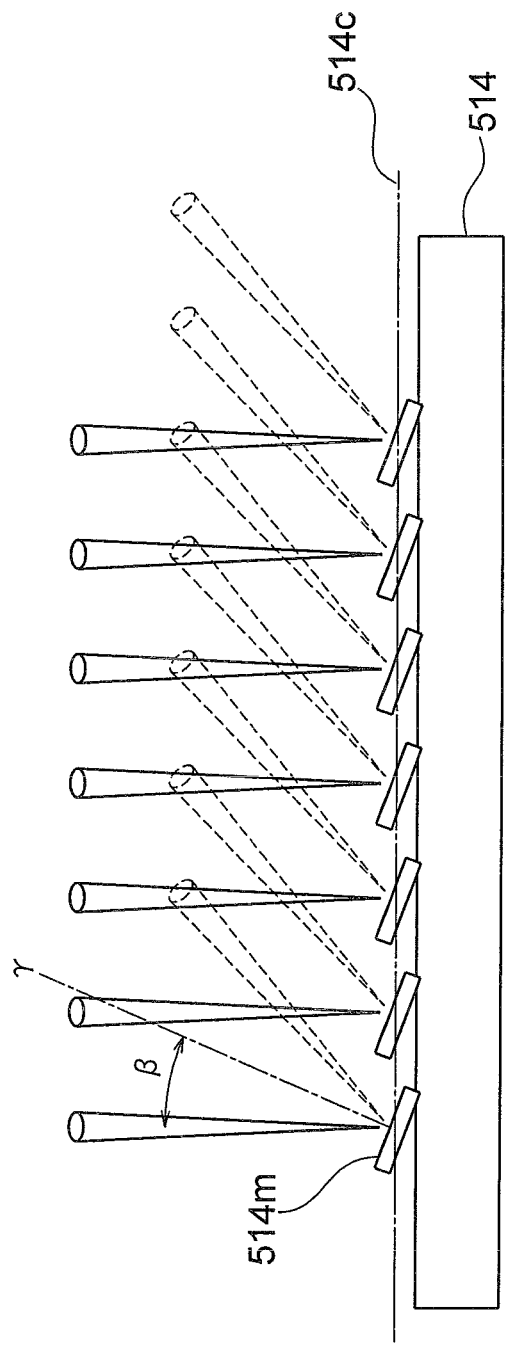
FIG. 28 is a side view of a structure of a mirror array from a first direction.
Figure 29A:
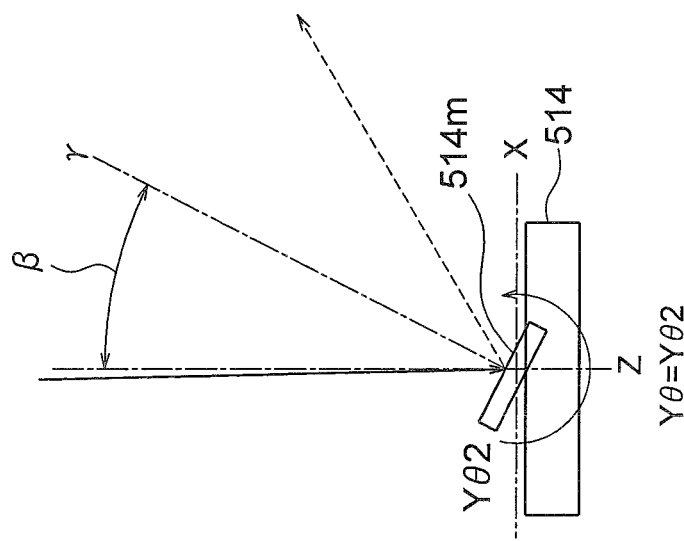
FIG. 29A depicts a reflection of a light incident on a mirror when the angle Yθ and Yθ1 when viewed from the first direction.
Figure 29B:
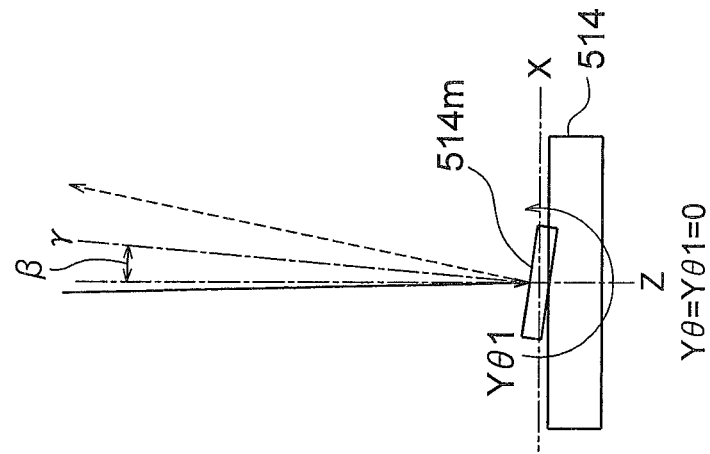
FIG. 29B depicts a reflection of a light incident on the mirror when the angle Yθ is Yθ2 when viewed from the first direction.

FIG. 25 is a side view of a structure of a wavelength selective switch according to a second embodiment. FIG. 26 is a top view of the structure of the wavelength selective switch according to the second embodiment. FIG. 27 is an enlarged view of a dispersion element 512 and a light condensing lens 513 shown in FIG. 26. FIG. 28 is a side view of a structure of a mirror array 514 from the first direction A1. FIG. 29A depicts a reflection of a light incident on a mirror 514m when the angle Yθ is Yθ1 when viewed from the first direction A1. FIG. 29B depicts a reflection of a light incident on the mirror 514m when the angle Yθ is Yθ2 when viewed from the first direction A1.

In the wavelength selective switch according to the second embodiment, an optical axis of the light condensing lens 513 is arranged such that it intersects with the dispersion point 21 in the second direction B1 as opposed to the wavelength selective switch according to the first embodiment in which the dispersion point 21 on the dispersion element 112, where the wavelength multiplexed light is dispersed for each wavelength, and the optical axis of the light condensing lens 113 are offset by ΔQ in the second direction B1.

In the wavelength selective switch according to the second embodiment, similar to the first embodiment, an interval between the dispersion element 512 and the light condensing lens 513 equals the focal length $f_1$. Due to this arrangement, the light of each wavelength condensed by the light condensing lens 513 on the mirror 514m of the mirror array to the same direction as that of the optical axis of the light condensing lens 513 along the second direction B1. A position of the mirror array 514 is arranged such that an interval between the mirror array 514 and the light condensing lens 513 is $f_1$ and the lights of all the wavelengths are condensed on the mirror 514m.

The mirror array 514 includes a plurality of the mirrors 514m arranged along the second direction B1. Similar to the mirror array 114 shown in FIGS. 4, 5A, and 5B, each of the mirrors 514m can independently rotate about the axis Xm along the X-axis with the angle Xθ, and about the axis Ym along the Y-axis with the angle Yθ.

An axis 514c (FIG. 28) connecting the condensing points of each wavelength is orthogonal to the optical axis of the light condensing lens 513. Furthermore, an angle along which the light of each wavelength launched from the light condensing lens 513 and incident on the mirror 514m of the mirror array 514 is passed in the second direction B1, is orthogonal to the axis 514c. The light of each wavelength condensed on the mirror 514m is incident with an inclined angle with respect to the reflecting surface of the mirror 514m, and is reflected by the mirror 514m to an angle that differs from the angle of incidence.

The light, which is reflected by the mirror 514m of the mirror array 514, passes to the light condensing lens 513 as a large light flux. When a panning angle of each mirror 514m is the same, the lights of all the wavelengths passed to the light condensing lens 513 are condensed at one point on the dispersion element 512 and launched from the dispersion element 512 as a wavelength multiplexed collimated light.

The condensing point where the lights are condensed on the dispersion element 512 is a position that is separated by the interval L from the dispersion point P1 on the dispersion element 512 where the wavelength multiplexed light from an input port 510c is dispersed in different directions by the dispersion element 512 depending on the wavelengths. The length L has a component LX (FIG. 26) along the second direction B1 and a component LY (FIG. 25) along the first direction A1.

The collimated light whose wavelengths are multiplexed by the dispersion element 512 is incident on a lens corresponding to an output port 510e of a lens array 511. The collimated light is not incident on a center of the lens; however, it is incident on a position that is displaced from the center at least by LX in the second direction B1. The collimated light is incident with the same angle as the optical axis of the lens and the light launched from the lens is condensed on the output port 510e.

An input/output port 510 includes a plurality of input/output ports. In the example shown in FIG. 25, the input/output port 510 includes four input ports 510a, 510b, 510c, and 510d that are arranged as an array with the same interval along the first direction A1 with the output port 510e at the center.

A U surface 510U is an imaginary surface that is orthogonal to the light launched from each input port of the input/output port 510. As shown in FIGS. 29A and 29B, when the angle of incidence β on the mirror 514m is not zero, the light that passes to the output port 510e is incident with an inclined angle with respect to the U surface 510U in the second direction B1. When the angle of incidence β on the mirror 514m is zero, the light that passes to the output port 510e is incident orthogonally to the U surface 510U in the second direction B1. Assuming an angle of an incident light on the U surface 510U to be θ, the angle of incidence θ of the light that passes to the output port 510e increases as the angle of incidence β increases. If the angle of incidence β exceeds a certain value, a position of incidence on the output port 510e is shifted to the second direction B1 by an aberration of the lens in the lens array 511, and if the angle of incidence β exceeds further, the input port 510c and the output port 510e are eventually uncoupled.

As shown in FIG. 28A, the reflective surface of the mirror 514m of the mirror array 514 is always arranged with an inclined angle with respect to the axis 514c that connects points on the mirror 514m where the lights of all the wavelengths are condensed. As shown in FIGS. 29A and 29B, a driving direction (horizontal direction in FIGS. 29A and 29B) of the mirror 514m along the second direction B1 is a direction to which the panned mirror 514m is further panned. With this structure, advantages similar to that of the first embodiment can be obtained and the hitless operation can be realized without increasing a panning range of the mirror 514m.

Figure 30:
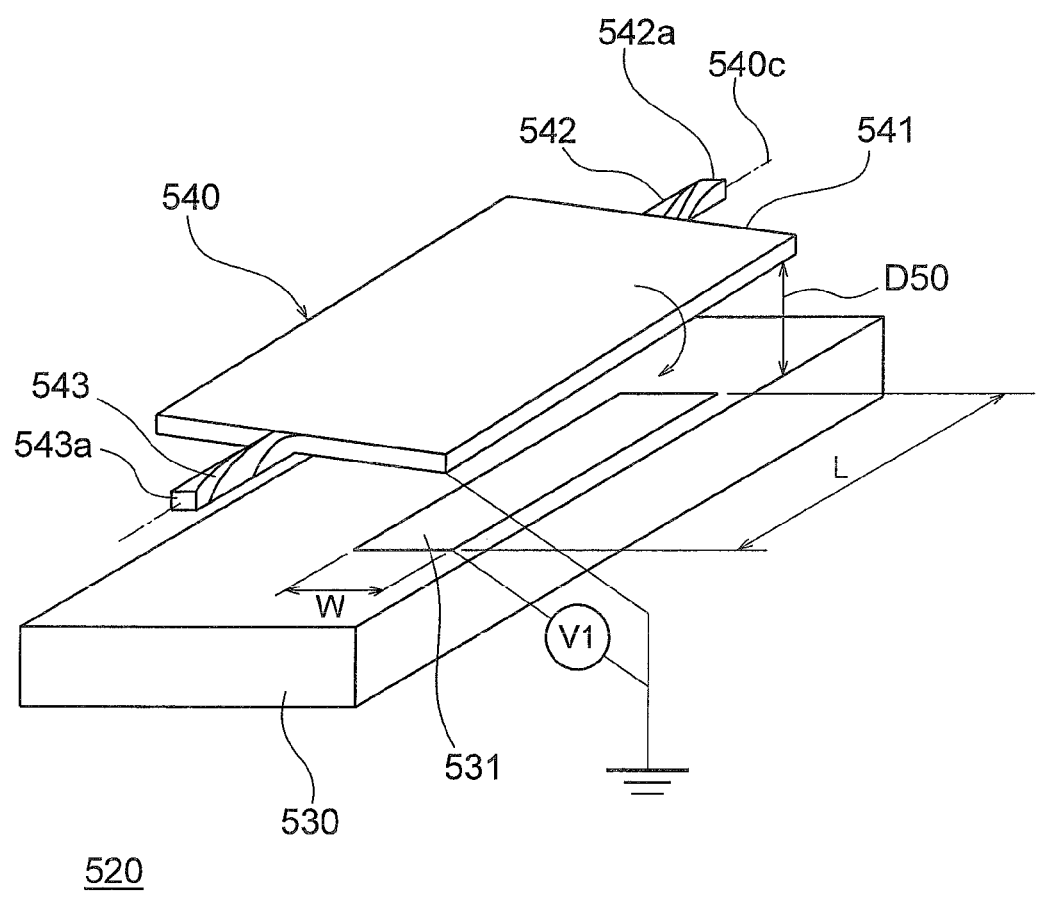
FIG. 30 is a perspective view of a structure of an MEMS mirror according to the second embodiment.

FIG. 30 is a perspective view of a structure of an MEMS mirror 520 according to the second embodiment.

As shown in FIG. 30, the MEMS mirror 520 includes a movable plate 540 having a reflective surface 541 on an upper surface, and a substrate 530 with a driving electrode 531 formed thereon. Similar to the movable plate 140 according to the first embodiment, the movable plate 540 that has an oblong plate shape includes a pair of hinges 542 and 543 that extend outward from both end faces in a longitudinal direction. The hinges 542 and 543 can be inclined by rotating about an axis 540c passing through the hinges 542 and 543. The driving electrode 531 has a length L and a width W, and that face toward a bottom surface of the movable plate 540. An electrostatic gap D50 is provided between the movable plate 540 and the driving electrode 531.

The bottom surface of the movable plate 540 has electric conductivity and the driving voltage V1 can be applied between the bottom surface and the driving electrode 531. When the driving voltage V1 is not applied, the bottom surface of the movable plate 540 is maintained at a constant potential (GND potential). When the driving voltage V1 is applied to the driving electrode 531, an electrostatic attractive force F is generated between the movable plate 540 and the driving electrode 531. Thus, the movable plate 540 rotates about the axis 540c and the movable plate 540 on the side of the driving electrode 531 inclines towards the driving electrode 531.

For example, as shown in FIG. 30, the mirror array 514 can pan the reflective surface of the mirror 514m by twisting the hinges 542 and 543 around the axis 540c and causing a panning axis of the mirror 514m to have a residual stress. The offset β1 of the angle of incidence β on the mirror 514m can be easily set by changing an amount of twisting arbitrarily. With this structure, the hitless operation can be realized with arrangements applicable to various wavelength selective switches without changing the arrangement of an optical system from the input/output port 510 to the light condensing lens 513.

Furthermore, other structures, operations, and advantages are the same as those of the first embodiment.

As described above, the wavelength selective switch according to the present invention is useful in the wavelength selective switch in which the hitless operation needs to be performed without increasing the range of the panning angle of the mirror.

In a wavelength selective switch according to the present invention, broadening of a band can be achieved and a hitless operation can be realized without increasing a panning range of a mirror.

What is claimed is:

1. A wavelength selective switch comprising:
   an optical input/output unit that includes an input port for launching wavelength multiplexed light and a plurality of output ports arranged in an array in a first direction;
   a light dispersing unit that receives the wavelength multiplexed light from the input port and disperses the wavelength multiplexed light into signal wavelengths in a second direction orthogonal to the first direction;
   a light condensing element for focusing the signal wavelengths along parallel paths in a passing direction; and
   an array of light deflecting elements, each element including a surface for deflecting one of the signal wavelengths in the first direction, so as to switch the signal wavelengths, focused by the light condensing element, to desired output ports, and in the second direction, so as to adjust angles of incidence or offset positions of the signal wavelengths relative to central axes of the desired output ports,
   wherein the array of light deflecting elements has a deflection range in the second direction from a minimum panning angle providing a first offset angle of incidence or position on the desired output port and a first light intensity of the signal wavelength below a maximum intensity, to a maximum panning angle providing a second angle of incidence or offset position and a second light intensity of the light intensity below the first light intensity and below a predetermined threshold, thereby providing hitless operation of the wavelength selective switch,
   wherein the deflection range is insufficient to achieve the hitless operation when the deflection range includes a normal angle of incidence of the signal wavelengths on the respective surfaces of the light deflecting elements in a plane including the second direction;
   wherein the light condensing element and the light deflecting element array are arranged such that the signal wavelengths are incident on the respective surfaces of the light deflecting elements at acute angles in the plane including the second direction at the minimum panning angle, and are coupled to the desired output ports at a reduced intensity caused by the acute angles, thereby achieving the hitless operation at the maximum panning angle of the light deflecting elements in the plane including the second direction;

wherein an optical loss of coupling of the signal wavelengths into the desired output ports only increases when the light deflecting elements of the array are spanned from the minimum panning angle to the maximum panning angle in the second direction.

2. The wavelength selective switch according to claim 1, wherein the light dispersing unit and the light condensing element are arranged such that the passing direction of the signal wavelengths focused by the light condensing element does not coincide with a central axis of the light condensing element in the second direction.

3. The wavelength selective switch according to claim 1, wherein the light deflecting element array is a mirror array that includes a plurality of MEMS mirrors arranged along the second direction, and the MEMS mirrors, absent voltage applied thereto, are inclined with respect to an axis connecting points on each mirror where the signal wavelengths are focused.

4. The wavelength selective switch according to claim 1, wherein a first signal wavelength of the wavelength multiplexed light launched from the input port impinges on the light condensing element at a first location, impinges on a surface of a corresponding one of the array of light deflecting elements set to the minimum panning angle, impinges again on the light condensing element at a second location offset from the first location in the second direction, and is coupled to the desired output port at the reduced intensity.

5. The wavelength selective switch according to claim 4, wherein the array of light deflecting elements comprises a tiltable MEMS mirror array, and wherein the first signal wavelength is coupled to the desired output port when a corresponding mirror of the tiltable MEMS mirror array is set to the minimum panning angle in the second direction.

6. The wavelength selective switch according to claim 4, wherein the light condensing element is a lens.

7. A wavelength selective switch comprising:
an optical input/output unit that includes at least one input port for inputting wavelength multiplexed light, and a plurality of output ports, wherein the input and output ports are arranged in an array extending in a first direction;
a light dispersing unit that receives the wavelength multiplexed light from the input port and disperses the wavelength multiplexed light into signal wavelengths spaced apart in a second direction orthogonal to the first direction;
a light condensing element that focuses the light dispersed into the signal wavelengths; and
an array of light deflecting elements that deflect the condensed light at the signal wavelengths, so as to switch the condensed light at the signal wavelengths to a selected one of the output ports, each of the light deflecting elements comprising a surface for deflecting the condensed light in the first and second directions, wherein each light deflecting element has an operational range of light deflection in the second direction from a minimum to a maximum panning angle, wherein the deflection range is insufficient to achieve a hitless operation of the wavelength selective switch when the deflection range includes a normal angle of incidence of the signal wavelengths on the respective surfaces of the light deflecting elements in a plane including the second direction;
wherein, when the surface of each light deflecting element is set to the minimum panning angle in the second direction, the light launched from the input unit impinges on the light condensing element at a first location, impinges on the surface, impinges again on the light condensing element at a second location offset from the first location in the second direction, and is coupled to the output unit at a reduced intensity caused by the offset between the first and second locations, thereby achieving the hitless operation at the maximum panning angle of the light deflecting elements in the plane including the second direction, and
wherein an optical loss of coupling of the light into the output unit only increases when each light deflecting element deflects light from the minimum panning angle to the maximum panning angle in the second direction.

8. The wavelength selective switch of claim 7, wherein the light condensing element has an optical axis offset in the second direction relative to a point where the light launched from the input port impinges on the light dispersing unit, whereby the second location is offset from the first location.

9. The wavelength selective switch of claim 7, wherein the light deflecting element array comprises an array of tiltable MEMS mirrors arranged along the second direction, and the MEMS mirrors, absent voltage applied thereto, are inclined with respect to an axis connecting points on each MEMS mirror where the light is condensed, whereby the second location is offset from the first location.

10. The wavelength selective switch of claim 7, wherein the plurality of output ports comprises sequentially disposed first, second, and third output ports.

11. A method of operating the wavelength selective switch of claim 10, comprising
(a) setting the surface of a first one of the array of light deflecting elements at a first panning angle in the first direction so as to couple a first signal wavelength of the wavelength multiplexed light launched from the input port into the first output port, and at the minimum panning angle in the second direction;
(b) upon completion of step (a), setting the surface of the first light deflecting element at the maximum panning angle in the second direction while keeping the first panning angle in the first direction;
(c) upon completion of step (b), setting the surface of the first light deflecting element at a second panning angle in the first direction while keeping the maximum panning angle in the second direction, so as to couple the first signal wavelength into the third output port when the surface of the first light deflecting element is set again to the minimum panning angle in the second direction, while avoiding momentary coupling of the light into the second output port when changing the setting of the surface from the first to the second panning angle; and
(d) upon completion of step (c), setting the surface of the first light deflecting element again to the minimum panning angle in the second direction, thereby coupling the light into the third output port,
wherein in step (c), the offset between the first and second locations causes an isolation between the input port and the second output port to increase by an amount larger than the intensity reduction.

12. The wavelength selective switch of claim 7, wherein the array of light deflecting elements comprises an array of MEMS mirrors, wherein each MEMS mirror is tiltable in response to a voltage applied thereto, wherein the minimum panning angle of each MEMS mirror corresponds to zero voltage applied to each MEMS mirror.

* * * * *